United States Patent
Ikeda et al.

(10) Patent No.: US 8,400,696 B2
(45) Date of Patent: Mar. 19, 2013

(54) THREE-DIMENSIONAL IMAGE DISPLAY AND THREE-DIMENSIONAL IMAGE DISPLAYING METHOD

(75) Inventors: Takahiro Ikeda, Cambridge, MA (US); Tamiki Takemori, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1083 days.

(21) Appl. No.: 10/585,253

(22) PCT Filed: Jan. 5, 2005

(86) PCT No.: PCT/JP2005/000042
§ 371 (c)(1),
(2), (4) Date: Apr. 8, 2009

(87) PCT Pub. No.: WO2005/066723
PCT Pub. Date: Jul. 21, 2005

(65) Prior Publication Data
US 2009/0219589 A1    Sep. 3, 2009

(30) Foreign Application Priority Data
Jan. 6, 2004    (JP) .................................. 2004-001303

(51) Int. Cl.
*G02B 5/32*    (2006.01)
(52) U.S. Cl. ........................................................ 359/21
(58) Field of Classification Search .................. 359/630; 250/550; 345/7–9, 418
See application file for complete search history.

(56) References Cited

U.S. PATENT DOCUMENTS
6,163,391 A * 12/2000 Curtis et al. .................... 359/29

FOREIGN PATENT DOCUMENTS
| JP | 9-258643 | 10/1997 |
| JP | 2000-250387 | 9/2000 |
| JP | 2002-228978 | 8/2002 |
| JP | 2002-277822 | 9/2002 |
| JP | 2003-005616 | 1/2003 |
| JP | 2003-167500 | 6/2003 |

OTHER PUBLICATIONS

Y. Tsunoda, High-Density Image Recording by Holographic Method, Optics, vol. 2, No. 6, pp. 329-346, 1973 (with English translation).
Ando et al., A See-Through Display Using the Maxwellian View with Holographic Optical Elements, Video Information Media Academic Journal, vol. 54, No. 10, pp. 1466-1473, 2000, (with English translation).

* cited by examiner

*Primary Examiner* — Jennifer L. Doak
(74) *Attorney, Agent, or Firm* — Drinker Biddle & Reath LLP

(57) ABSTRACT

A three-dimensional image displaying apparatus comprises a spatial light modulation element having a discrete pixel structure and expressing a hologram, an illumination optical system generating reconstruction light by causing illumination light to enter said spatial light modulation element that expresses the hologram, and a lens as a reconstruction image converting optical system displaying a reconstruction image by producing a virtual image wavefront-converted from the reconstruction light.

7 Claims, 20 Drawing Sheets

THREE-DIMENSIONAL IMAGE DISPLAY AND THREE-DIMENSIONAL IMAGE DISPLAYING METHOD

TECHNICAL FIELD

The present invention relates to an apparatus and method that display a three-dimensional reconstruction image by causing illumination light to enter a spatial light modulation element that expresses a hologram.

BACKGROUND ART

A three-dimensional image displaying apparatus using a hologram can, by causing illumination light to enter the hologram, produce reconstruction light from the hologram and display a three-dimensional reconstruction image expressed by means of the reconstruction light. The hologram can be created through computation in addition to being made by causing interference, on a photographic plate, between object light and illumination light. A hologram created through computation is known as a 'computer hologram'. A three-dimensional image displaying apparatus using a computer hologram provides a spatial light modulation element with a computer hologram, produces reconstruction light from the spatial light modulation element by causing illumination light to enter the spatial light modulation element, and displays a reconstruction image by means of the reconstruction light.

The technology disclosed in Patent Document 1 is known as three-dimensional image display technology using a computer hologram. In the technology disclosed in Patent Document 1, the reconstruction image to be displayed (hereinafter referred to as 'target reconstruction image') is regarded as an aggregate of a plurality of bright points and it is assumed that spherical waves produced by each of the plurality of bright points reach the hologram plane. A computer hologram is created by convolving spherical waves and planar transmission waves that reach the pixel positions from each of the plurality of bright points on the target reconstruction image, in the respective pixel positions on the hologram plane. When illumination light is made to enter the spatial light modulation element that expresses the computer hologram, at least one of the amplitude and phase of the illumination light is modulated by each pixel of the spatial light modulation element, whereby reconstruction light is produced by the spatial light modulation element. Then, a reconstruction image is displayed by a reconstruction image converting optical system (more specifically, a convex lens) producing a virtual image or real image wavefront-converted from the reconstruction light.

Also, in Patent Document 1, when the spatial light modulation element can modulate only one of the amplitude and phase, a mask is provided on the back focal plane of the reconstruction image converting optical system. Further, by the mask that blocks zero-order light (light emitted in the same emission direction as the incident direction among the illumination light that enters the spatial light modulation element), and diffracted waves and conjugate waves of an unnecessary order, and that transmits reconstruction light obtained through diffraction of a specified order, the observer can observe the reconstruction image obtained by the transmitted reconstruction light.

In Non-Patent Document 1, a random phase shifter method is described. Object light is generated by causing light to enter a spatial light modulation element that expresses an image and an optical Fourier transform of the object light is made to interfere with reference light on a photographic plate. When, as a result, a Fourier transform hologram is recorded, the dynamic range of the light sensitivity of the light-sensitive material is exceeded because the object light enters focused on one point of the photographic plate, whereby spectral noise appears prominently in the reconstruction image. The random phase shifter method is intended to resolve such a problem and, by randomizing the degree of phase modulation of the respective pixels in the spatial light modulation element that expresses an image, the distribution of object light falling incident on the photographic plate is widened so that the light intensity at the photographic plate does not exceed the dynamic range of the light sensitivity of the light-sensitive material. As a result, a reconstruction image with reduced spectral noise can be obtained.

In Patent Document 1, Patent Document 2, or Non-Patent Document 2, a stereo displaying apparatus that displays different images onto both eyes of the observer is described. Generally, in a stereo displaying apparatus, the image formation position on the retina is fixed and there is no match between the sense of distance due to the parallax of the two eyes and the interval between the image locations of the two eyes. Hence, the observer feels a large amount of fatigue due to the mismatch between the focusing and convergence of the eyes. The technology described in Patent Document 1, Patent Document 2, or Non-Patent Document 2, is intended to resolve this problem.

A device using the Maxwell effect, which is described in Patent Document 2 or Non-Patent Document 2, causes the formation of an image on the retina by means of only the light transmitted through the middle of the pupil of the observer's eye. As a result, a blurring of the image observed by the observer becomes smaller, irrespective of the focusing of the observer's eyes. On the other hand, a device satisfying the super multieye condition, which is described in Patent Document 3, causes a parallax image comprising a plurality of luminous fluxes to enter the pupil of the observer's eye. As a result, the focusing of the observer's eyes is guided close to a stereo image and the sense of distance caused by the parallax of the two eyes and the interval between the image formation positions of the two eyes are matched each other.

Patent Document 1: Japanese Patent Application Laid-Open No. 09-258643
Patent Document 2: Japanese Patent Application Laid-Open No. 2002-277822
Patent Document 3: Japanese Patent Application Laid-Open No. 2002-228978
Non-Patent Document 1: Yoshito TSUNODA, 'Holographic high-density image recording', Optics, Vol. 2, No. 6, pages 329 to 346, 1973
Non-Patent Document 2: Takahisa ANDO, et al. 'A See-through display using the Maxwell effect by means of a holographic optical element', Video Information Media Academic Journal, Vol. 54, No. 10, pages 1466 to 1473, 2000

DISCLOSURE OF THE INVENTION

Problems that the Invention is to Solve

The inventors have studied the conventional three-dimensional image displaying technique in detail, and as a result, have found problems as follows.

That is, since the amount of computation and the used memory amount are huge when creating a computer hologram in the case of the three-dimensional image display technology disclosed in Patent Document 1, a reduction in the amount of computation and the used memory amount is desirable. Furthermore, in order to reduce the amount of computation and the used memory amount, the respective bright point positions in an image that is reconstructed directly from the spatial light modulation element (hereinafter referred to as 'directly reconstruction image') are generally matched on a plane perpendicular to the optical axis with any pixel position of the spatial light modulation element (hereinafter referred to as 'condition 1'), and the initial phase of each bright point is generally afforded a prescribed value by rendering the shortest distance between the spatial light modulation element and the directly reconstruction image an integer multiple of the wavelength of the illumination light (hereinafter referred to as 'condition 2').

These conditions 1 and 2 will be further explained as follows. Suppose that, in the case that the respective bright point positions in the directly reconstruction image do not match any of the pixel positions of the spatial light modulation element (that is, when condition 1 is not satisfied), it is necessary to compute the distance between all the respective bright point positions in the directly reconstruction image and the respective pixel positions of the spatial light modulation element in the case of all combinations thereof and, therefore, a tremendous increase in the computation amount is induced. In contrast, in the case that condition 1 is satisfied, since the number of cases of a relative positional relationship between the respective bright point positions in the directly reconstruction image and the respective pixel positions of the spatial light modulation element is then smaller, the computation is reduced. The number of types of spherical waves produced from the bright points in the directly reconstruction image is further reduced as a result of condition 2 also being satisfied in addition to condition 1, and the amount of memory required in order to store the computation results of spherical waves that are computed and prepared beforehand is reduced.

However, in the case that a certain other condition is satisfied while both condition 1 and condition 2 are satisfied, the following problem arises. That is, in the case that both condition 1 and condition 2 are satisfied, since the optical distance from the directly reconstruction image to the back focal plane of the reconstruction image converting optical system is fixed, light enters on one point of the back focal plane in a focused way. In addition, since light that enters the focal point is blocked by a O-order mask, the amount of light of the reconstruction image that can be observed by the observer decreases. In the case of a reconstruction image in which a low spatial frequency component is dominant in particular, that is, in the case of a reconstruction image in which the variation in brightness values is small, since the majority of the reconstruction light is blocked by the mask, the amount of light of the reconstruction image that can be observed by the observer decreases significantly. Also, the reconstruction light reaching the pupil of the observer's eyes has inadequate spread and is only distributed in the localized portion of the pupil and, consequently, the focusing function of the observer's eyes does not work effectively and the sense of distance sensed by the focusing function of the eyes is inadequate.

In order to resolve the above problem, in the case of the three-dimensional image display technology disclosed in Patent Document 1, invoking the random phase shifter method described in Non-Patent Document 1 may be considered. In this case, the initial phase of the respective bright points of the target reconstruction image is assigned a random value, and, in the respective pixel positions on the hologram plane, the spherical waves and planar transmission waves that reach the pixel positions from a plurality of bright points on the target reconstruction image are convolved. However, since the number of grayscales of the amplitude modulation or phase modulation of light of the respective pixels is limited by the spatial light modulation element that expresses the computer hologram, the cases, where the high frequency components negate one another during convolution and the high frequency components are not displayed while displaying the reconstruction image, arise. In addition, since the cases, where high frequency components are not displayed, occur randomly, spectral noise is observed in the reconstruction image and the display quality is considerably impaired.

When the Maxwell effect, described in Patent Document 2 or Non-Patent Document 2, is used in the case of the three-dimensional image display technology described in Patent Document 1, a reconstruction image in which the blurring is always small is observed and, therefore, a white blur that corresponds with the distance to the object when the focusing of the eyes is out of place as in real space does not reappear. Accordingly, the sense of distance sensed by the focusing function of the eyes is impaired.

Furthermore, when a device, which satisfies the super multi-eye condition disclosed in Patent Document 3, is applied in the case of the three-dimensional image display technology described in Patent Document 1, a display element that causes different parallax images to enter a plurality of regions that are separated on the surface of the pupil of the observer's eye, and an optical system that guides the luminous flux from the display element to each of the plurality of regions on the surface of the pupil are required. The device therefore becomes complex and large.

The present invention is made to solve the aforementioned problem, and it is an object to provide a three-dimensional image displaying apparatus capable of displaying a high quality reconstruction image by allowing the focusing function of an observer's eyes to work effectively by means of a simple constitution, as well as a three-dimensional image displaying method.

Means for Solving the Problems

The three-dimensional image displaying apparatus according to the present invention comprises a spatial light modulation element that has a discrete pixel structure and expresses a hologram, an illumination optical system producing reconstruction light by causing illumination light to enter the spatial light modulation element that expresses the hologram, and a reconstruction image converting optical system displaying a reconstruction image by producing a virtual image wavefront-converted from the reconstruction light. In particular, in the three-dimensional image displaying apparatus, at least one of the bright point interval and the initial phase value of the respective bright points constituting the target reconstruction image to be displayed is set such that peaks of the reconstruction light, reaching a region where the observation of reconstruction image obtained through diffraction of a specified order by the spatial light modulation element is permitted, are produced at different plural points on a back focal plane of the reconstruction image converting optical system. As a result, a hologram capable of expressing a target reconstruction image is presented by the spatial light modulation element.

In addition, the three-dimensional image displaying method according to the present invention provides a spatial light modulation element having a discrete pixel structure with a hologram, produces reconstruction light by causing illumination light to enter the spatial light modulation element, and displaying a virtual image wavefront-converted from the reconstruction light by the reconstruction image converting optical system. In particular, the three-dimensional image displaying method provides a spatial light modulation element with a hologram capable of displaying a target reconstruction image to be displayed by setting at least one of the bright point interval and initial phase value of the respective bright points constituting the target reconstruction image such that peaks of reconstruction light reaching a region, where the observation of a reconstruction image obtained through diffraction of a specified order by the spatial light modulation element is permitted, are produced at different plural points on the back focal plane of the reconstruction image converting optical system.

In accordance with the present invention, a hologram is presented by the spatial light modulation element with a discrete pixel structure, the reconstruction light is produced by causing illumination light to enter the spatial light modulation element, and the virtual image is wavefront-converted from the reconstruction light by the reconstruction image converting optical system, thereby displaying the reconstruction image. In particular, when a hologram is presented by the spatial light modulation element, at least one of the bright point interval and the initial phase value of the respective bright points constituting the target reconstruction image to be displayed is suitably established. As a result, a plurality of peaks of reconstruction light arrive within a region, where the observation of reconstruction image produced by diffraction of a specified order by the spatial light modulation element is permitted, on the back focal plane of the reconstruction image converting optical system. Therefore, the focusing function of the observer's eyes is able to work effectively as a result of reconstruction light distributed in the vicinity of each of the plurality of optical peak positions entering the pupil of the eye at the same time. In addition, a reconstruction image in which a low spatial frequency component is dominant can also be favorably observed.

Furthermore, the distribution of the bright point intervals and the initial phase values of the respective bright points constituting the target reconstruction image to be displayed preferably has a cyclical structure and the distribution of the peak positions of the reconstruction light on the back focal plane of the reconstruction image converting optical system corresponds to the cyclical structure.

In the three-dimensional image displaying apparatus or three-dimensional image displaying method according to the present invention, the initial phase values of the respective bright points constituting the target reconstruction image are preferably varied as time elapses. In this case, the interference fringe pattern superposed on the reconstruction image is temporally offset, whereby the effect of the interference fringe pattern is reduced and a more vivid reconstruction image can be displayed.

The three-dimensional image displaying apparatus according to the present invention may further comprise a mask provided on the back focal plane of the reconstruction image converting optical system. The mask transmits light components reaching peak positions of the reconstruction light that arrives into the region where the observation of reconstruction image obtained through diffraction of a specified order is permitted, and, in contrast, blocks light components rendered through diffraction of an order other than the specified order. On the other hand, the three-dimensional image displaying method according to the present invention preferably uses a mask of this kind and displays a reconstruction image by means of the light component having passed through the mask. In this case, the entry of unnecessary light into the pupil of the observer's eye can be prevented and a more vivid reconstruction image can be observed.

In the three-dimensional image displaying method according to the present invention, the interval of the peak positions of the reconstruction light arriving in the region, where the observation of reconstruction image obtained through diffraction of a specified order by the spatial light modulation element is permitted, on the back focal plane of the reconstruction image converting optical system is preferably smaller than the diameter of the pupil of the observer observing the reconstruction image. Also, supposing that the wavelength of the illumination light is $\lambda$, the focal length of the reconstruction image converting optical system is f, the pixel pitch of the spatial light modulation element is p, the diameter of the pupil of the observer observing the reconstruction image is d, and the interval of the bright points of an equal initial phase value among the bright points constituting the target reconstruction image is Np (N is an integer of two or more), the following relationship is preferably satisfied:

$$d/2 > \lambda f/(Np)$$

In such cases, the super multi-eye condition is satisfied because reconstruction light, which is distributed in the vicinity of the plurality of optical peak positions, enters the pupil of the eye at the same time, thereby effectively making use of the focusing function of the eye. Furthermore, the reconstruction image in which a low spatial frequency component is dominant can also be favorably observed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

EFFECTS OF THE INVENTION

In accordance with the present invention, a high quality reconstruction image can be displayed by effectively making use of the focusing function of the observer's eyes with a simple constitution.

Figure 1:
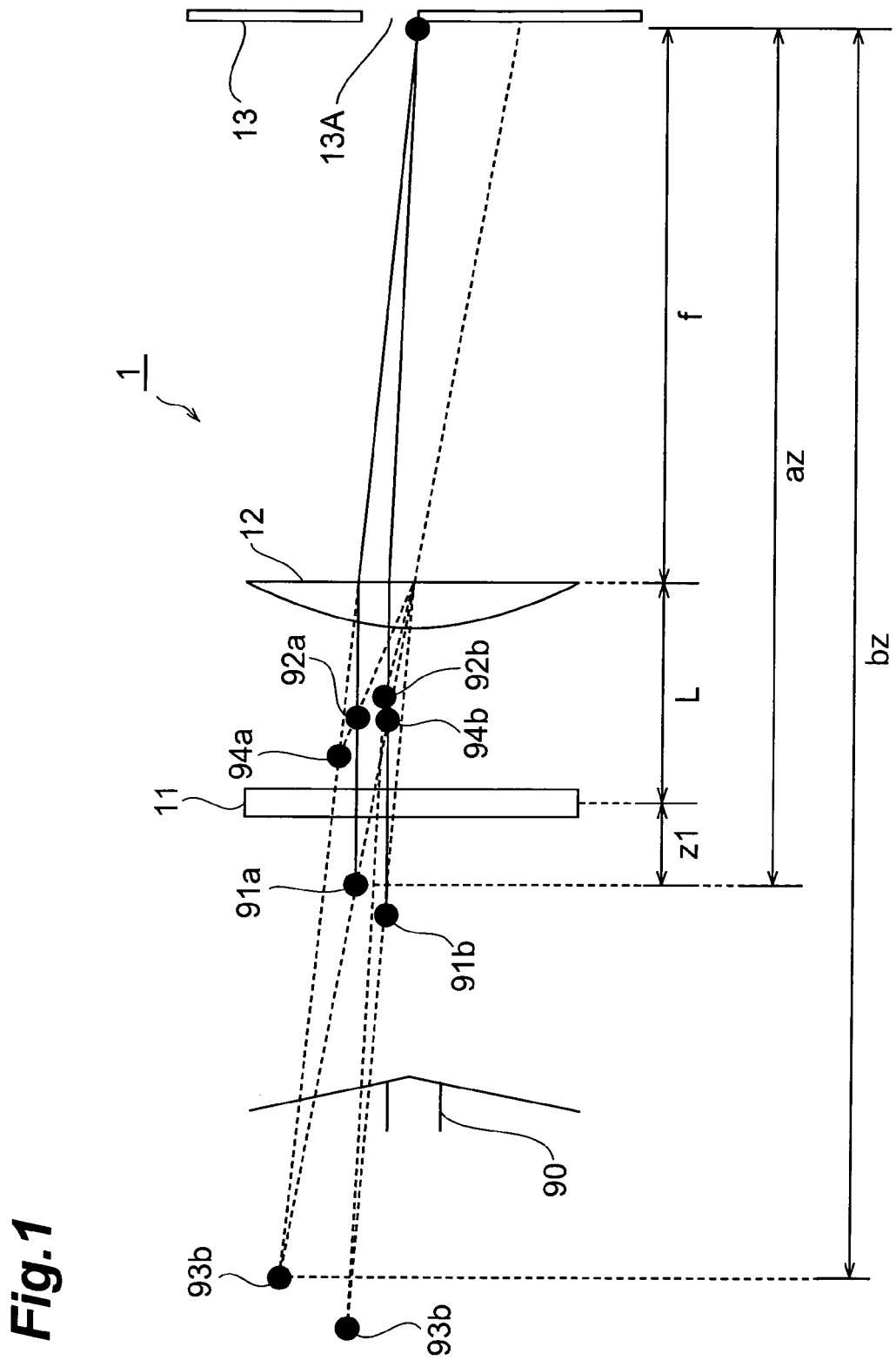
FIG. 1 is a view for explaining an optical system and operation in a three-dimensional image displaying apparatus 1.

DESCRIPTION OF THE REFERENCE NUMERALS 1, 2 . . . three-dimensional image displaying apparatus; 11 . . . spatial light modulation element; 12 . . . convex lens (reconstruction image converting optical system); 13 . . . mask; 13A aperture portion; 14 . . . point light source; 15 . . . half mirror; 71 . . . bright point; 81 . . . zero-order light reaching position; 91 . . . directly reconstruction image; and 93 . . . displayed reconstruction image.

BEST MODES FOR CARRYING OUT THE INVENTION

In the following, embodiments of a three-dimensional image displaying apparatus and a three-dimensional image displaying method according to the present invention will be explained in detail hereinbelow with reference to FIGS. 1 to 20. In the explanation of the drawings, constituents identical to each other will be referred to with numerals identical to each other without repeating their overlapping descriptions.

In order to afford the observer a sense of distance by effectively making use of the focusing function of the eyes of an observer observing a certain object, light from the object must enter the surface of the pupil of the observer's eyes. In particular, a state where the wavefront of the light from the object enters the whole surface of the pupil of the observer's eyes is a natural state from the standpoint of the observer and the sense of distance is satisfied by effectively making use of the focusing function of the observer's eyes. The width of the wavefront of the light reaching the surface of the pupil of the observer's eyes is desirably of the same magnitude as the width of the pupil surface or equal to or greater than the same magnitude. As the width of the wavefront of the light reaching the pupil surface of the observer's eyes increases, the focusing function of the observer's eyes works more effectively and the observer is permitted a better sense of distance.

Conversely, in the cases where the wavefront of the light reaching the pupil surface of the observer's eyes is narrow and light is transmitted only through a localized portion of the pupil surface, a state where the so-called photographic object depth is deep is occurred, similarly to a state where the iris of the pupil of a lens is reduced, and a state where the focus is correct both in a distant view and in a close view is occurred. In such a state, natural blur that corresponds to the distance to the object when the focusing of the eyes is out of place does not appear but the sense of distance sensed by the focusing function of the eyes is impaired.

Three-dimensional image display technology using a hologram produces reconstruction light by causing illumination light to enter the hologram and displays a reconstruction image by means of the reconstruction light and reproduces light from objects in the natural world. Therefore, the wavefront of the reconstruction light produced from the hologram desirably reaches a wide area of the pupil surface of the eyes of the observer observing the reconstruction image.

The three-dimensional image displaying apparatus and three-dimensional image displaying method according to the present invention described hereinbelow can more effectively makes use of the focusing function of the observer's eyes and can overcome the above problem.

FIG. 1 is a view for explaining an optical system and operation of the three-dimensional image displaying apparatus 1. The three-dimensional image displaying apparatus 1 shown in FIG. 1 comprises a spatial light modulation element 11, a convex lens 12, and a mask 13. Here, for the sake of expediency in the explanation, an xyz orthogonal coordinate system is established and the z axis is matched with the optical axis of the lens 12 to match the point of origin with the back focal position of the lens 12.

The spatial light modulation element 11 has a discrete pixel structure, and a plurality of pixels are arranged in two dimensions with a fixed pitch. The spatial light modulation element 11 is disposed parallel to the xy plane and modulates and transmits at least one of the amplitude and phase of the light entering each pixel and outputs the modulated light. The lens 12 acts as a reconstruction image converting optical system. Light that is modulated and outputted by the spatial light modulation element 11 is inputted, and then a reconstruction image is displayed by producing a virtual image wavefront-conversted from the light. The mask 13 is disposed at the back focal plane of the lens 12 and has an aperture portion 13A. The mask 13 uses the aperture portion 13A to transmit light beams from the peak positions, among the reconstruction light arriving in the region where the observation of reconstruction image obtained through diffraction of a specified order is permitted, but blocks light beams reaching the edge of the region.

A hologram is presented by the spatial light modulation element 11 as a result of establishing the degree of modulation of the amplitude or phase of the light of each of the pixels of the spatial light modulation element 11. The illumination light 90 enters the spatial light modulation element 11 providing the hologram parallel to the z axis as parallel light from the left in FIG. 1. The illumination light 90 that enters the spatial light modulation element 11 has the amplitude or phase modulated in each pixel. The light that has been modulated and outputted for each pixel by the spatial light modulation element 11, that is, the reconstruction light forms a directly reconstruction image (image reconstructed directly by the spatial light modulation element). In FIG. 1, the bright points 91a and 91b represent the bright points of a directly reconstruction image (virtual image) and the bright points 92a and 92b represent the bright points of a directly reconstruction image (real image).

The reconstruction light us wavefront-converted to a virtual image by the lens 12, and a reconstruction image is formed. In FIG. 1, the bright points 93a and 93b represent the bright points of the reconstruction image and the bright points 94a and 94b represent the bright points of the conjugate image. And then, the observer, whose eye pupils are placed close to the aperture portion 13A of the mask 13, can observe the reconstruction image (hereinafter referred to as 'display reconstruction image') via the aperture portion 13A. Here, zero-order light and diffracted waves and conjugate waves of unnecessary orders are blocked by the mask 13 and do not enter the pupil of the observer's eyes.

Suppose that the coordinate values of a bright point of a directly reconstruction image are (ax', ay', az') and the coordinate values of a bright point of the corresponding display reconstruction image are (bx', by', bz'). Suppose also that the focal length of the lens 12 is f. Here, the relationship between the parameters is expressed by Equations (1a) and (1b) below based on an analogous relationship and expressed by Equation (2) below based on a lens image formation formula.

[Equation 1]

$$ax' = f\frac{bx'}{bz'} \quad (1a)$$

$$ay' = f\frac{by'}{bz'} \quad (1b)$$

[Equation 2]

$$\frac{1}{az' - f} + \frac{1}{f - bz'} = \frac{1}{f} \quad (2)$$

The coordinate value az' of a bright point of the directly reconstruction image is expressed by Equation (3) below from Equations (1a), (1b) and Equation (2).

[Equation 3]

$$az' = 2f - \frac{f^2}{bz'} \quad (3)$$

On the other hand, the distance zl between the spatial light modulation element 11 and the bright point of the directly reconstruction image is expressed by Equation (4) below.

[Equation 4]

$$z1 = az' - (L + f) \quad (4)$$
$$= f - L - \frac{f^2}{bz'}$$

The plural pixels are arranged in two dimensions at a pitch p in the x axis direction and the y axis direction in the spatial light modulation element 11. The x coordinate value ax' and the y coordinate value ay' of the bright point of the directly reconstruction image are approximated by the following Equations (5a) and (5b) respectively as an integer multiple of the pixel pitch based on the abovementioned condition 1 (that each of the bright point positions in the directly reconstruction image be made to match, in the xy plane, any pixel position of the spatial light modulation element 11). Here, m and n are integers. The approximation values for ax' and ay' are ax and ay.

[Equation 5]

$$ax' \approx m \cdot p = ax \quad (5a)$$

$$ay' \approx n \cdot p = ay \quad (5b)$$

Suppose the wavelength of the illumination light 90 is $\lambda$. Based on the abovementioned condition 2 (that the distance between the spatial light modulation element 11 and the directly reconstruction image should be an integer multiple of the wavelength $\lambda$ of the illumination light and the initial phase of the respective bright points has a fixed value, the z coordinate value az' of the bright point of the directly reconstruction image is approximated by Equation (6) below. Here, h is an integer. s reprovides a fixed initial phase value and is simply value 0. The approximation value for az' is az.

[Equation 6]

$$az' \approx h \cdot \lambda + s = az \quad (6)$$

When ax, ay, and az are used, the coordinate value bx, by, and bz of the bright points of the display reconstruction image from Equations (1a), (1b), and (3) are represented by Equations (7a), (7b) and (7c) below.

[Equation 7]

$$bx = \frac{ax \cdot bz}{f} \quad (7a)$$

$$by = \frac{ay \cdot bz}{f} \quad (7b)$$

$$bz = \frac{f^2}{2f - az} \quad (7c)$$

Figure 2:
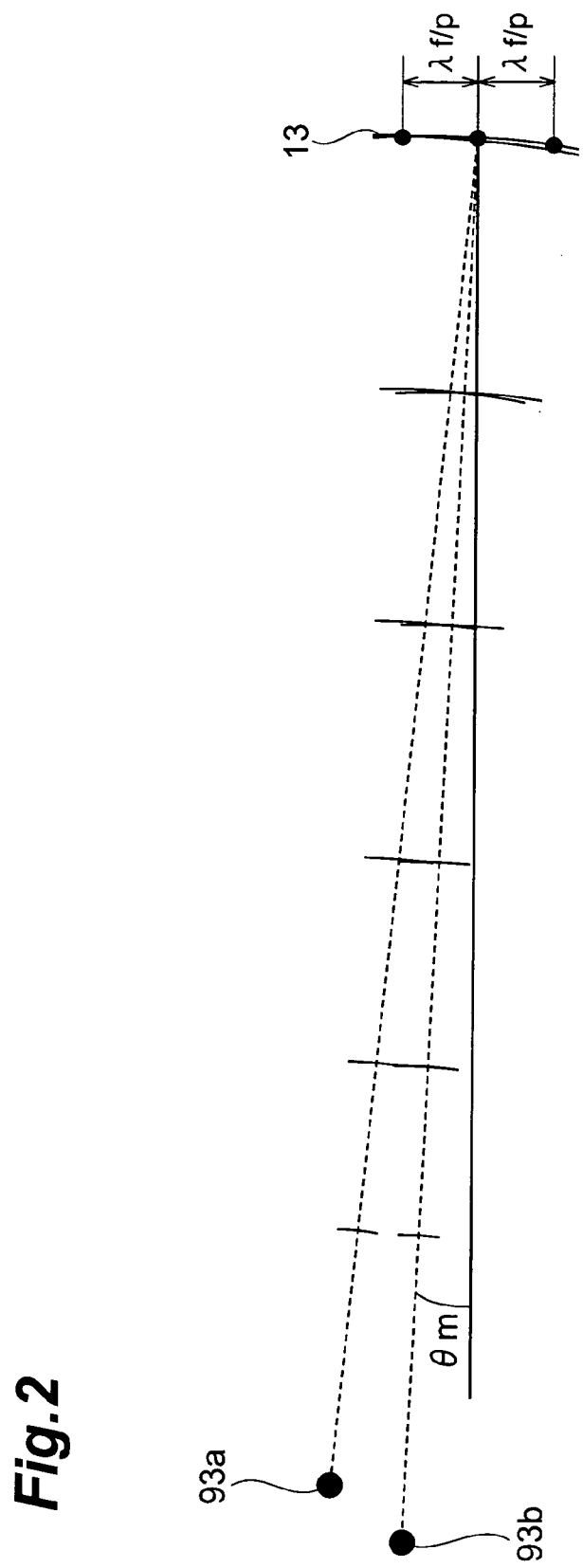
FIG. 2 is a view for explaining the optical system obtained by removing a spatial light modulation element and lens from the three-dimensional image displaying apparatus 1.

FIG. 2 is a view for explaining the optical system obtained by removing the spatial light modulation element 11 and lens 12 from the three-dimensional image displaying apparatus 1. The spherical waves emitted by the bright points 93a and 93b of the display reconstruction image are transmitted via the aperture portion 13A of the mask 13 at the back focal plane of the lens 12 and enter the pupil of the observer's eye disposed close to the aperture portion 13A, whereby the observer can observe the display reconstruction image. The angle θm formed between the azimuth in which the spherical wave emitted from a bright point in position (bx, by, bz) enters the back focal plane of the lens 12, and the optical axis is expressed by Equation (8) below.

[Equation 8]

$$\theta m = \tan^{-1}\left(\frac{bx}{bz}\right) \qquad (8)$$
$$= \tan^{-1}\left(\frac{m \cdot p}{f}\right)$$

Since bz is an integer multiple of the illumination light wavelength λ, the optical distance from each bright point of the display reconstruction image to the back focal position of the lens 12 is substantially constant. Therefore, in the back focal position of the lens 12, the spherical waves emitted from each bright point of the display reconstruction image are reinforced through interference and the optical intensity is stronger. Also, in a paraxial region, the optical intensity grows stronger at pitch λf/p at the back focal plane of the lens 12. In the case of a three-dimensional display reconstruction image that is displayed by means of a plurality of bright points, the spherical waves emitted by each of the plurality of bright points reach the back focal plane of the lens 12 in overlapped fashion.

However, as a result of the action of the mask 13 disposed at the back focal plane of the lens 12, zero-order light, not only are diffracted waves and conjugate waves of an unnecessary order blocked but also light that reaches parts where the optical intensity is strong as a result of such interference. Therefore, the amount of light entering the pupil of the observer's eye via the aperture portion 13A of the mask 13 decreases significantly. In the case of a reconstruction image of an object of uniform brightness without a pattern in particular, that is, in the case of a reconstruction image in which a low spatial frequency component is dominant, the amount of light of a reconstruction image that can be observed by the observer decreases significantly.

Therefore, in three-dimensional displaying apparatus and three-dimensional displaying method according to the present invention, the spatial light modulation element 11 is provided with a hologram capable of displaying the target reconstruction image, by setting at least one of the bright point interval and initial phase value of the respective bright points constituting the target reconstruction image to be displayed such that the peaks of the reconstruction light reaching within a region, where the observation of reconstruction image rendered through diffraction of a specified order by the spatial light modulation element 11 is permitted. As a result, a plurality of peak positions of the reconstruction light reaching the pupil of the observer's eye can be obtained and the focusing function of the observer's eye can be made to work effectively, whereby a high-quality reconstruction image can be displayed. In addition, the three-dimensional image displaying apparatus according to the present invention has a simple constitution.

By setting both or one of the bright point interval and initial phase value of the respective bright points constituting a directly reconstruction image, the interval of the bright points of equal initial phase values among the respective bright points of the directly reconstruction image is an N multiple (N is an integer or two or more) of pixel pitch p of the spatial light modulation element 11. Here, in the paraxial region, the optical intensity grows stronger at a pitch λf/Np at the back focal plane of the lens 12. Further, suppose that the pupil diameter of the observer's eye is d. There are generally individual differences in the pupil diameter d which differs according to the amount of incident light, but the pupil diameter is 3 mm, for example. Here, when the pitch (λf/(Np)) of the peak position of the reconstruction light reaching the pupil of the observer's eye is smaller than pupil radius (d/2), there is a plurality of peak positions of the reconstruction light reaching the pupil of the observer's eye.

Furthermore, the observer's pupil desirably exists in a region of width (λf/p) in which a reconstruction image rendered through diffraction of a specified order by the spatial light modulation element 11 in the back focal plane of the lens 12 is desirable. On the basis of the information above, the relationship of Equation (9) is preferably established between the pixel pitch p of the spatial light modulation element 11, the focus length f of the lens 12, the interval Np of bright points with equal initial phase values among the respective bright points of the directly reconstruction image, the illumination light wavelength λ, and the pupil diameter d of the observer's eye. More particularly, the relationship inequality on the right side of Equation (9) must be satisfied.

[Equation 9]

$$\frac{\lambda \cdot f}{p} > d > \frac{2\lambda \cdot f}{N \cdot p} \qquad (9)$$

When the display reconstruction image as mentioned earlier is seen by the observer's eye that is disposed close to the aperture portion 13A of the mask 13, a direction of viewing a bright point for which the m value is zero in Equation (5a) and a direction of viewing a bright point for which the m value is N among the plurality of bright points of the display reconstruction image provide the largest viewing angle. This angle θ1 is expressed by Equation (10) below.

[Equation 10]

$$\theta 1 = \tan^{-1}\left(\frac{N \cdot p}{f}\right) \qquad (10)$$

On the other hand, supposing that the eyesight of the observer is 1.0, it may be said that the observer can identify an object with a size of 3.0 mm in a position that is a distance of 10 m away. The viewing angle θ in this case is given by Equation (11) below.

[Equation 11]

$$\theta\min = \tan^{-1}\left(\frac{3.0}{10000}\right) = 0.017 \text{ deg} \qquad (11)$$

If the viewing angle θ1 is expressed by Equation (10) is smaller than a viewing angle θmin expressed by Equation (11) above, a reconstruction image that exceeds the majority of the resolution of the observer's eye is displayed. That is, Equation (12) below is preferably satisfied.

[Equation 12]

$$\frac{N \cdot p}{f} < \frac{3.0}{10000} \qquad (12)$$

Figure 3:
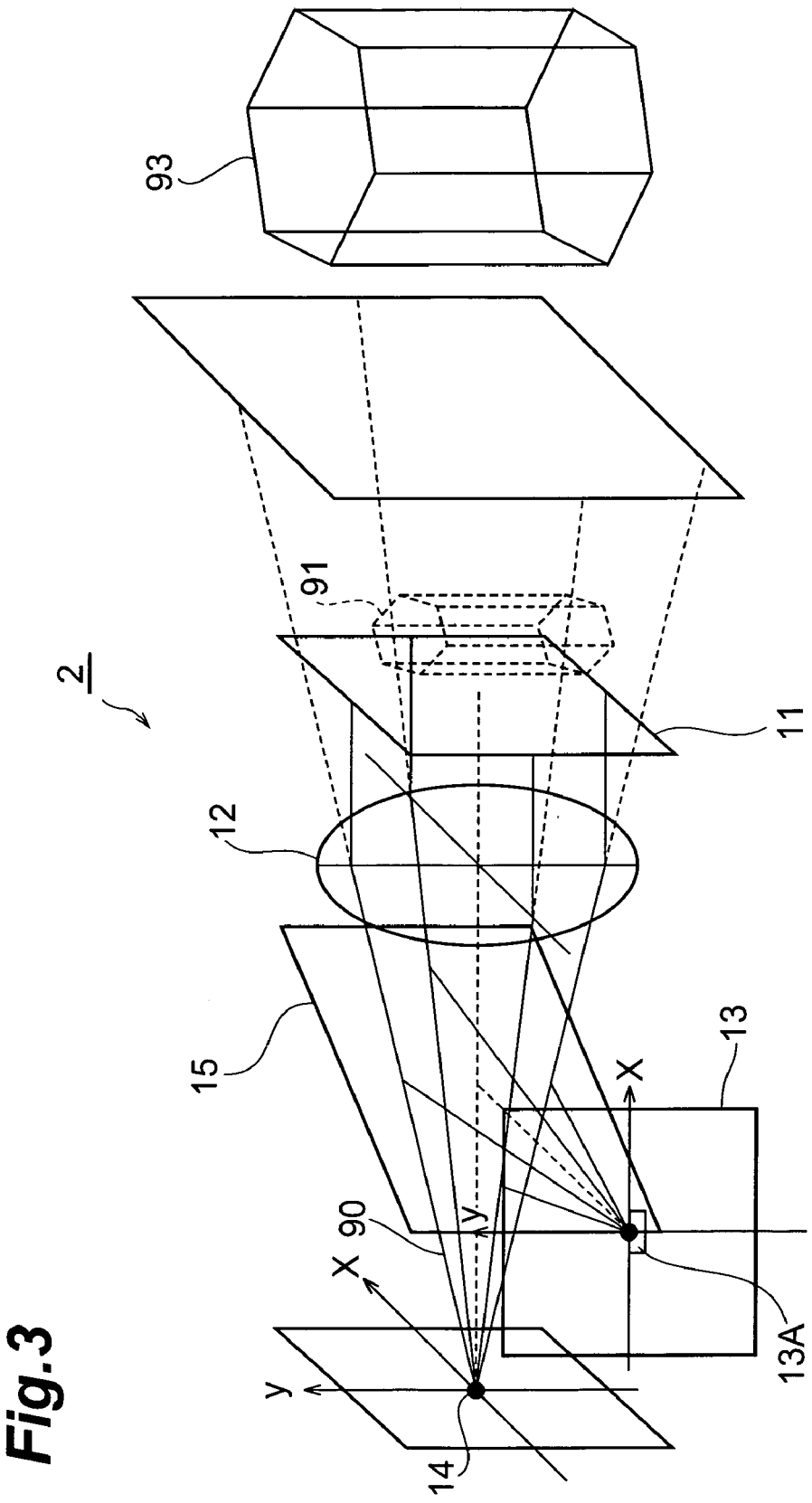
FIG. 3 is, a view for explaining an optical system in a three-dimensional image displaying apparatus 2.

FIG. 3 is a view for explaining an optical system of a three-dimensional image displaying apparatus 2. The three-dimensional image displaying apparatus 2 shown in FIG. 3 comprises the spatial light modulation element 11, convex lens 12, mask 13, a point light source 14 and a half mirror 15. Here, for the sake of expediency in the description, an xyz orthogonal coordinate system is established and the z axis is matched with the optical axis of the lens 12.

The spatial light modulation element 11 used by the three-dimensional image displaying apparatus 2 is one of a reflective type. The spatial light modulation element 11 has a discrete pixel structure and has a plurality of pixels are arranged in two dimensions with a fixed pitch p. The spatial light modulation element 11 is disposed parallel to the xy plane and modulates and reflects both or either one of the amplitude and phase of the light entering each pixel and outputs the modulated light.

The point light source 14, half mirror 15, and lens 12 constitute an illumination light system that causes illumination light to enter the spatial light modulation element 11 as parallel light. The optical distance from the point light source 14 to the lens 12 via the half mirror 15 is equal to the focal length f of the lens 12. The illumination light emitted from the point light source 14 under a divergence condition enters the lens 12 after being transmitted by the half mirror 15 and enters the spatial light modulation element 11 after being rendered parallel light by the lens 12.

The lens 12 and half mirror 15 constitute a reconstruction image converting optical system that displays a reconstruction image by wavefront-converting the reconstruction light produced by the spatial light modulation element 11 to a virtual image. The optical distance from the lens 12 to the mask 13 via the half mirror 15 is equal to the focal length f of the lens 12. The reconstruction light produced by the spatial light modulation element 11 is wavefront-converted by the lens 12 and is reflected by the half mirror 15 before arriving at the mask 13 on the back focal plane of the lens 12. The aperture portion 13A of the mask 13 transmits light components reaching the peak positions of the reconstruction light that arrives in a region where the observation of reconstruction image rendered through diffraction of a specified order is permitted. On the other hand, the aperture portion 13A blocks, in addition to zero-order light and diffracted waves and conjugate waves of unnecessary orders, light beams reaching the edge of the region.

In the case that the spatial light modulation element 11 modulates both the amplitude and the phase, since conjugate waves are not produced, a hologram can be expressed in the whole area of the spatial light modulation element 11, and the size of the region, where the observation of reconstruction image rendered through diffraction of a specified order is permitted, is then $\lambda f/p \times \lambda f/p$. On the other hand, in the case that the spatial light modulation element 11 modulates only one of the amplitude and phase, a hologram can be expressed in only a half plane of the spatial light modulation element 11, the size of the region, where, the observation of reconstruction image rendered through diffraction of a specified order is permitted, is $\lambda f/p \times \lambda f/(2p)$, and conjugate waves are blocked by the mask 13.

The spatial light modulation element 11 expresses the hologram, by setting the degree of amplitude or phase modulation of light for each of the pixels of the spatial light modulation element 11. The illumination light 90, which has outputted from the point light source 14 and rendered parallel light by the lens 12 after being transmitted by the half mirror 15, enters the spatial light modulation element 11 expressing the hologram, in parallel to the z axis. The amplitude or phase of the illumination light 90 enters the spatial light modulation element 11 is modulated by each pixel. The light, that is, reconstruction light that is modulated and reflected for each pixel by the spatial light modulation element 11 forms a directly reconstruction image 91. The illumination light is wavefront-converted by the lens 12 to a virtual image, and then a reconstruction image is formed. Furthermore, the observer, whose eye pupil is disposed close to the aperture portion 13A of the mask 13, can observe a displayed reconstruction image 93 via the aperture portion 13A and half mirror 15. Here, zero-order light and diffracted waves and conjugated waves of unnecessary orders is blocked by the mask 13 and does not enter the pupil of the observer's eye.

The three-dimensional image displaying apparatus 2 shown in FIG. 3, as compared with the three-dimensional image displaying apparatus 1 shown in FIG. 1 earlier, differs in that the spatial light modulation element 11 is one of the transmitting-type and reflective-type and, in this context, also differs due to the presence of the half mirror 15. However, despite differing in these respects, it may be said that the three-dimensional image displaying apparatus 2 and three-dimensional image displaying apparatus 1 are substantially the same optical system. Therefore, the items described earlier with respect to the three-dimensional image displaying apparatus 1 (FIG. 1) are the same for the three-dimensional image displaying apparatus 2 (FIG. 3). Also, the following explanation is common to both the three-dimensional image displaying apparatus 1 (FIG. 1) and the three-dimensional image displaying apparatus 2 (FIG. 3).

In the following, a case where the spatial light modulation element 11 modulates only one of the amplitude and phase will be explained. Suppose that the pixel pitch p of the spatial light modulation element 11 is 8.1 μm, the focal length f of the lens 12 is 40 mm, the point light source 14 is an LED, and the wavelength λ of the illumination light output by the point light source 14 is 650 nm. Furthermore, suppose that the size of the aperture portion 13A of the mask 13 is the same as the size of the region permitting the observation of a reconstruction image through diffraction of a specified order, i.e. 3.2 mm×1.6 mm. A comparative example and a few embodiments will be explained hereinbelow based on the above premise.

Figure 4:
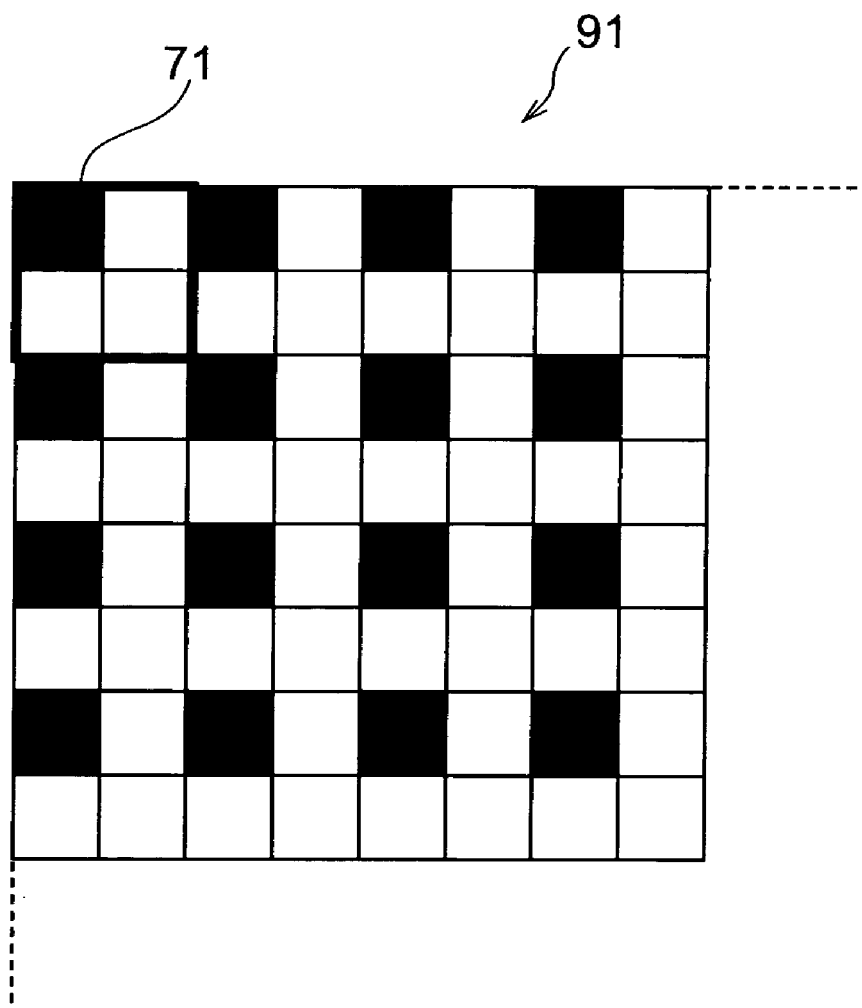
FIG. 4 is a view for explaining a bright point interval of a directly reconstruction image 91 in a comparative example.
Figure 5:
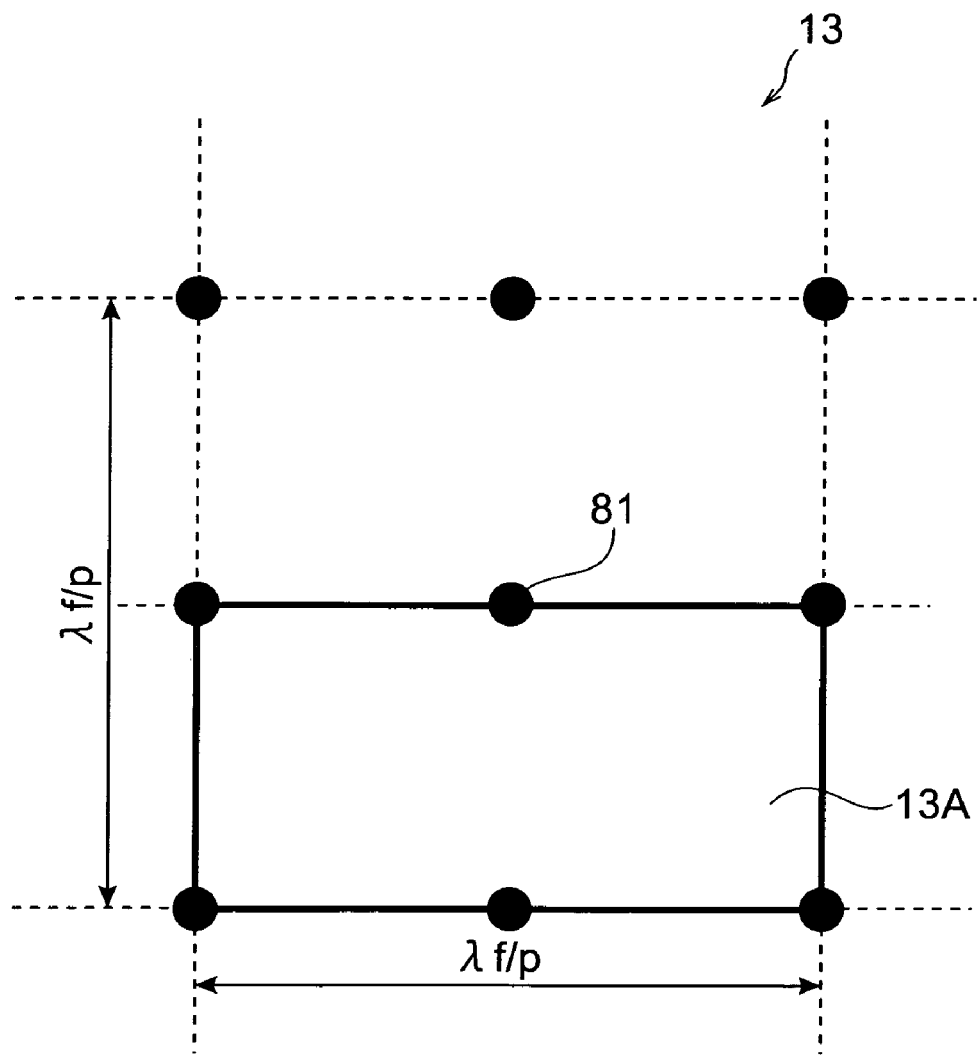
FIG. 5 is a view for explaining peak positions of light that reaches the back focal plane of a lens 12 in a comparative example.

First, the comparative example will be explained. FIG. 4 is a view for explaining the bright point interval of the directly reconstruction image 91 in the comparative example. FIG. 5 is a view for explaining the peak positions of the light reaching the back focal plane of the lens 12 in the comparative example.

FIG. 4 shows the result of viewing a portion of the directly reconstruction image 91 in the optical axis direction. In FIG. 4, positions on the directly reconstruction image 91 that correspond to the positions of the respective pixels of the spatial light modulation element 11 are indicated by squares of the smallest individual unit, and the positions of bright points 71 with the brightness values of the directly reconstruction image 91 are indicated by squares painted black. A range equivalent to one cycle of the brightness distribution in the directly reconstruction image 91 is indicated by a bold rectangular frame.

FIG. 5 shows the result of viewing the mask 13 disposed at the back focal plane of the lens 12 is view in the optical axis direction. In FIG. 5, the edge of the aperture portion 13A that transmits the reconstruction light to be observed is indicated by a solid-line rectangular frame. The range of the region reached by a conjugate wavefront with respect to the reconstruction light reaching the aperture portion 13A is indicated by a broken line rectangular frame. The zero-order light reaching position 81 is indicated by a central black circle. The peak position of the arriving reconstruction light is indicated by a black circle.

Here, the items described with respect to the views of FIGS. 4 and 5 are also the same for similar drawings described subsequently.

In a comparative example, the bright points 71 with brightness values of the directly reconstruction image 91 that is directly generated by the spatial light modulation element 11 are disposed cyclically at a pitch 2p (two times the pixel pitch p of the spatial light modulation element 11) in the x axis direction and y axis direction respectively as shown in FIG. 4. In addition, the initial phase values of the bright points 71 with these brightness values are fixed.

At this time, the peaks of the light reaching the back focal plane of the lens 12 are positioned cyclically at a pitch of 1.6 mm $(=\lambda f/(2p))$ in the x axis direction and the y axis direction respectively as shown in FIG. 5, and they exist at the edge of the aperture portion 13A of the mask 13 but do not exist within the aperture portion 13A (excluding the edge). Therefore, in the comparative example, it is difficult for an observer whose eye is disposed close to the aperture portion 13A to observe a reconstruction image in which a low spatial frequency component is dominant.

Figure 6:
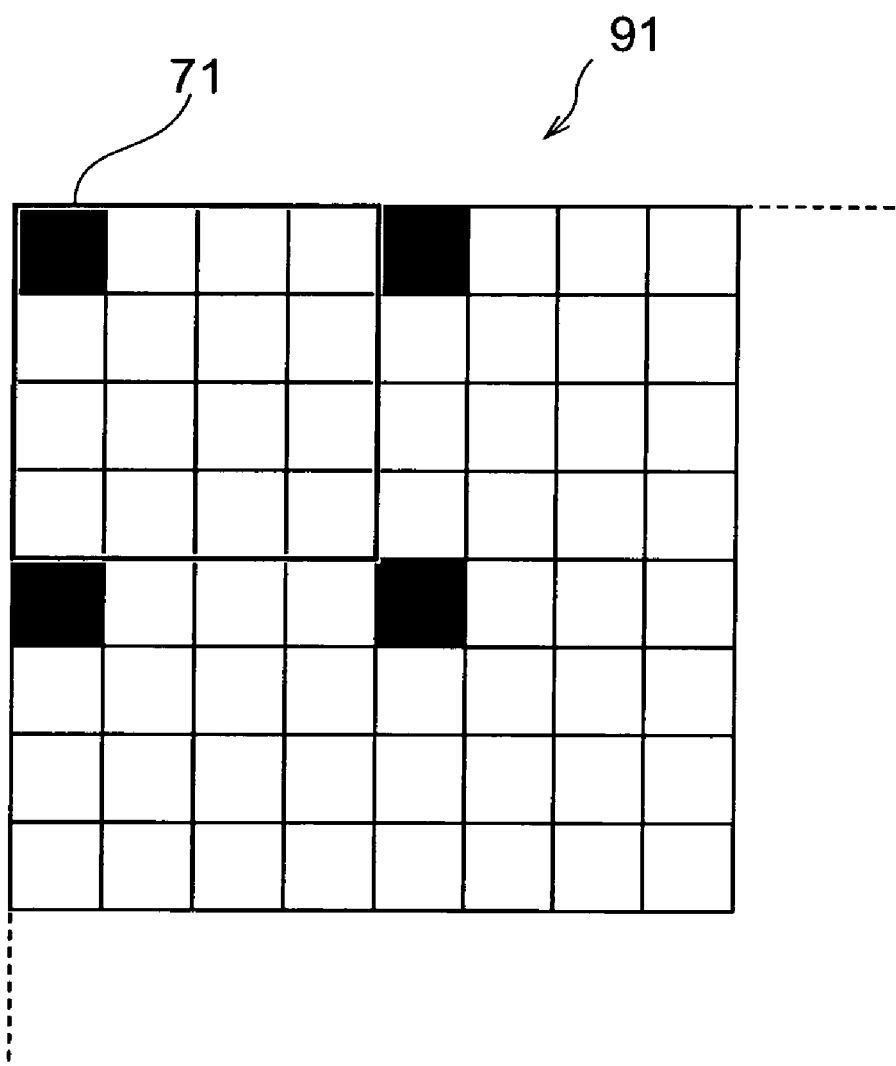
FIG. 6 is a view for explaining a bright point interval of the directly reconstruction image 91 in a first embodiment.
Figure 7:
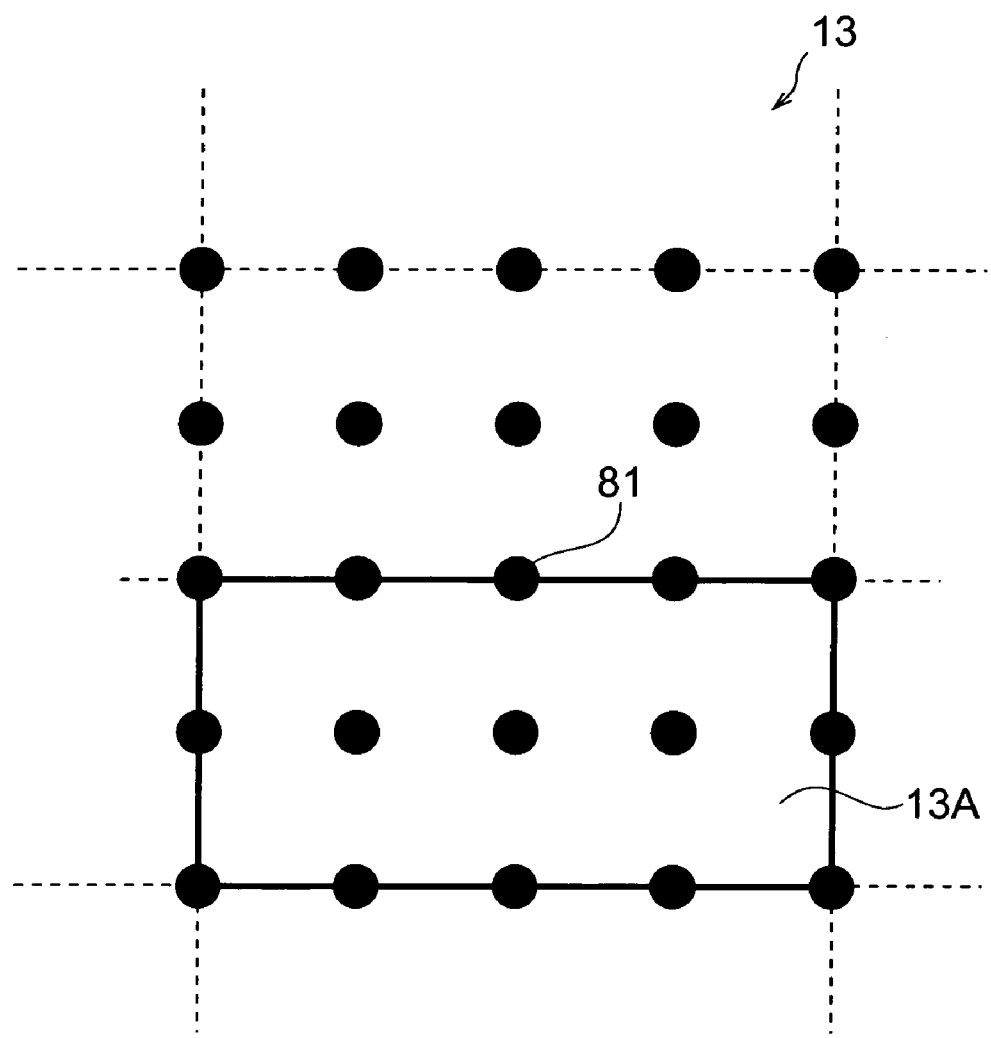
FIG. 7 is a view for explaining peak positions of light that reaches the back focal plane of the lens 12 in the first embodiment.

The first embodiment will be explained next. FIG. 6 is a view for explaining the bright point interval of the directly reconstruction image 91 in the first embodiment. FIG. 7 is a view for explaining the peak positions of light that reaches the back focal plane of the lens 12 in the first embodiment.

In the first embodiment, the bright points 71 with brightness values of the directly reconstruction image 91 that is directly generated by the spatial light modulation element 11 are disposed cyclically at a pitch 4p (four times the pixel pitch p of the spatial light modulation element 11) in the x axis direction and y axis direction respectively as shown in FIG. 6. Furthermore, the initial phase values of the bright points 71 with these brightness values are fixed.

At this time, the peaks of light reaching the back focal plane of the lens 12, in the case of the first embodiment, are located cyclically at a pitch of 0.8 mm $(=\lambda f/(4p))$ in the x axis direction and the y axis direction respectively as shown in FIG. 7 and, among such peaks, three optical peak positions exist within the aperture portion 13A (excluding the edge) of the mask 13. The three optical peak positions in the aperture portion 13A are peak positions of reconstruction light rendered through diffraction of a specified order by the spatial light modulation element 11 are arranged in the x axis direction. The reconstruction light distributed close to the three optical peak positions includes a parallax image component that corresponds with the respective positions.

Accordingly, in the first embodiment, the eye focusing function of the observer, whose eye is disposed close to the aperture portion 13A, is made to work effectively because reconstruction light distributed close to each of the three optical peak positions enters the pupil of the eye simultaneously. Consequently, three images are displaced in the x axis direction when the focal point of the eye is out of place and a reconstruction image with natural blur in the x axis direction can be observed. Furthermore, a reconstruction image in which a low spatial frequency component is dominant can also be favorably observed.

Figure 8:
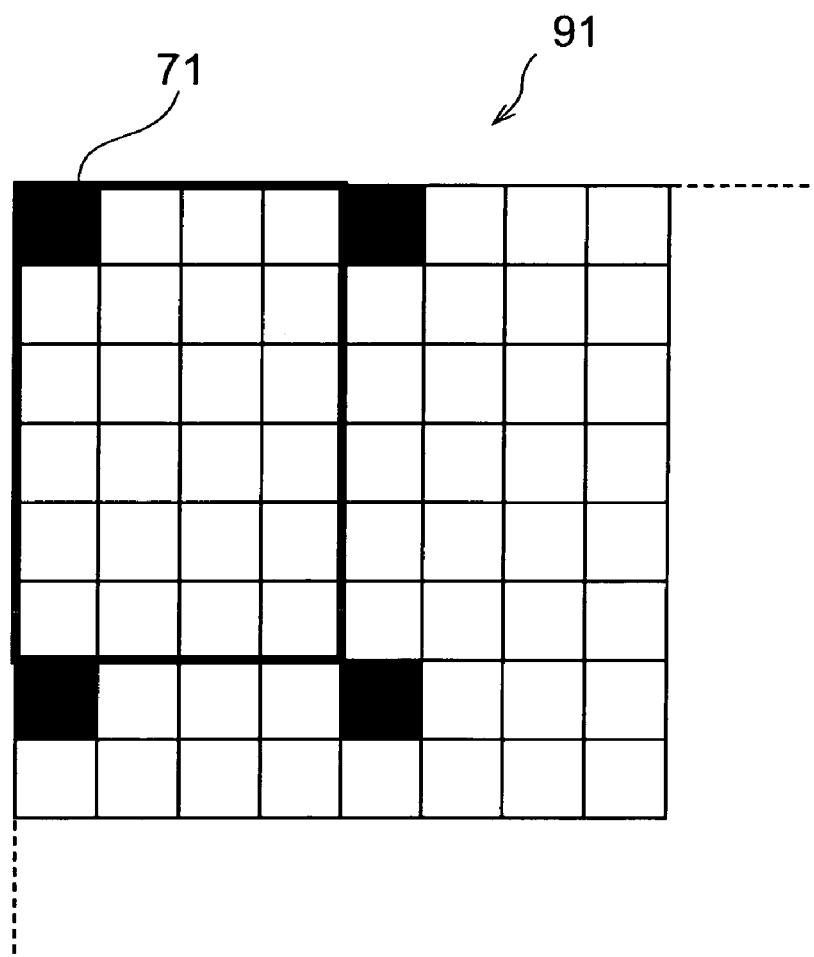
FIG. 8 is a view for explaining a bright point interval of the directly reconstruction image 91 in a second embodiment.
Figure 9:
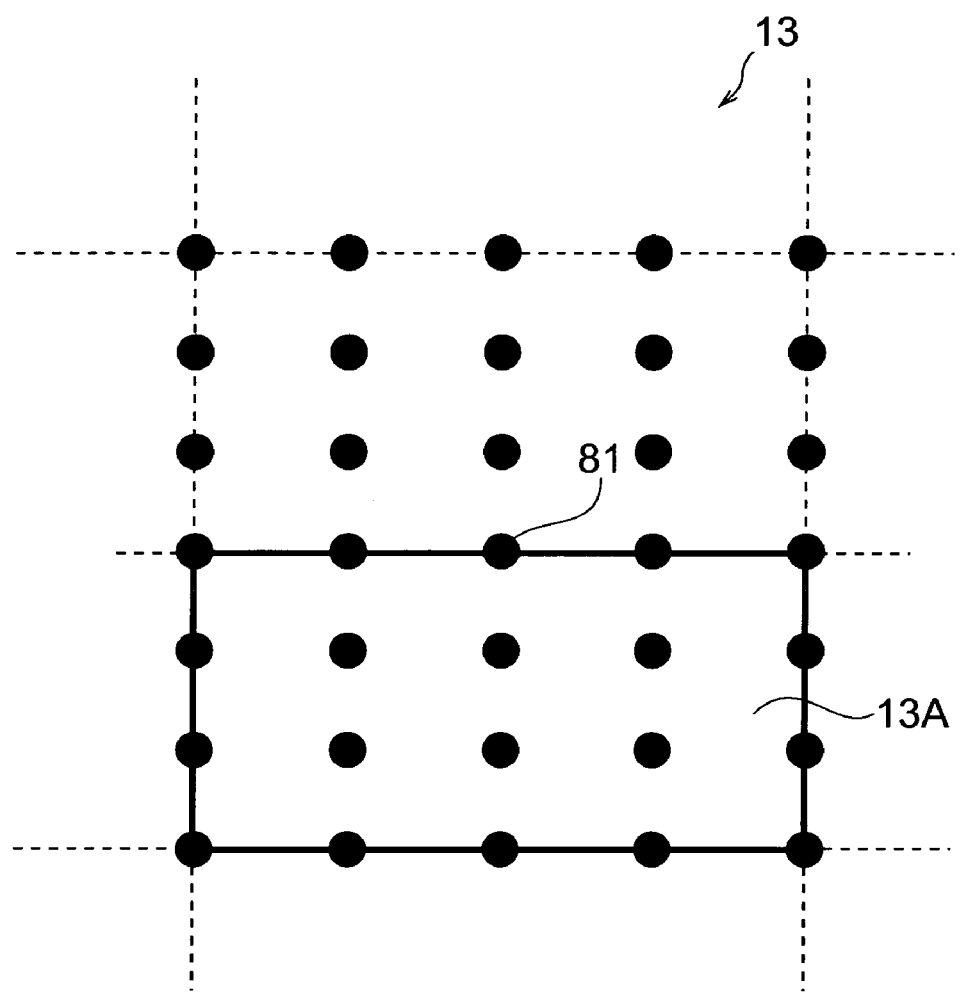
FIG. 9 is a view for explaining peak positions of light that reaches the back focal plane of the lens 12 in the second embodiment.

The second embodiment will be explained next. FIG. 8 is a view for explaining the bright point interval of the directly reconstruction image 91 in the second embodiment. FIG. 9 is a view for explaining the peak position of light that reaches the back focal plane of the lens 12 in the second embodiment.

In the second embodiment, the bright points 71 with brightness values of the directly reconstruction image 91 that is directly generated by the spatial light modulation element 11 are disposed cyclically at a pitch 4p (four times the pixel pitch p of the spatial light modulation element 11) in the x axis direction and disposed cyclically at a pitch 6p (six times the pixel pitch p of the spatial light modulation element 11) in the y axis direction as shown in FIG. 8. Also, the initial phase values of the bright points 71 with these brightness values are fixed.

At this time, the peaks of the light reaching the back focal plane of the lens 12, in the case of the second embodiment, are positioned cyclically at a pitch of 0.8 mm $(=\lambda f/(4p))$ in the x axis direction and are positioned cyclically at a pitch of 0.53 mm $(=\lambda f/(6p))$ in the y axis direction respectively as shown in FIG. 9 and, among these peaks, optical peak positions of six points exist within the aperture portion 13A (excluding the edge) of the mask 13. The six respective optical peak positions in the aperture portion 13A are peak positions of reconstruction light rendered through diffraction of a specified order by the spatial light modulation element 11 that are arranged in three columns in the x axis direction and two rows in the y axis direction. The reconstruction light distributed close to each of the six optical peak positions includes a parallax image component that corresponds with each position.

Accordingly, in the second embodiment, the eye focusing function of the observer, whose eye is disposed close to the aperture portion 13A is made to work effectively because reconstruction light distributed close to each of the six optical peak positions enters the pupil of the eye simultaneously. Consequently, three images are displaced in the x axis direction and two images are displaced in the y axis direction when the focal point of the eye is out of place and a reconstruction image with natural blur in the x axis direction and y axis direction can be observed. Furthermore, a reconstruction image in which a low spatial frequency component is dominant can also be favorably observed.

Figure 10:
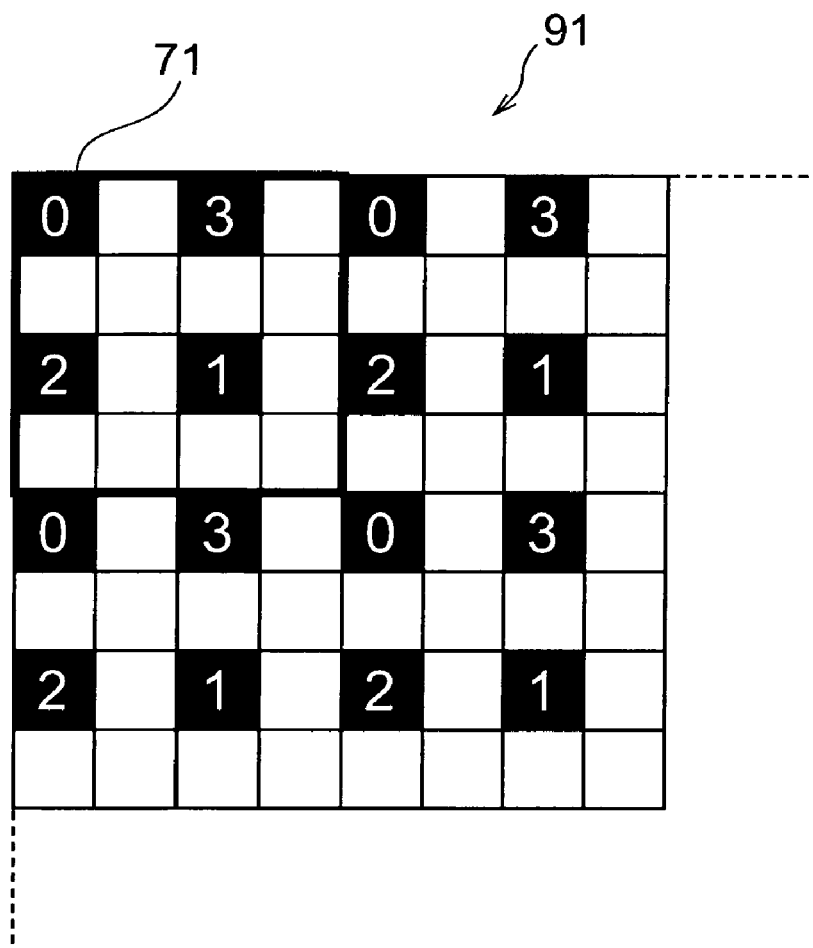
FIG. 10 is a view for explaining a bright point interval and initial phase value of the directly reconstruction image 91 in a third embodiment.

The third embodiment will be explained next. FIG. 10 is a view for explaining the bright point interval and initial phase value of the directly reconstruction image 91 in a third embodiment.

The view of FIG. 10 is the same as that of FIG. 4 and so forth. In addition, the initial phase values of the bright points 71 with the brightness values of the directly reconstruction image 91 are denoted by numbers in the squares painted black. The number '0' denotes the reference value of the initial phase value, the number '1' indicates that the initial phase value is 'reference value+$\pi/2$', the number '2' indicates that the initial phase value is 'reference value+$\pi$', and the number '3' indicates that the initial phase value is 'reference value+$3\pi/2$'.

In the third embodiment, the bright points 71 with the brightness values of the directly reconstruction image 91 reconstructed directly by the spatial light modulation element 11 are the same as those of the comparative example and are disposed cyclically at a pitch 2p (two times the pixel pitch p of the spatial light modulation element 11) in the x axis direction and y axis direction. Furthermore, the initial phase values of the bright points 71 with the brightness values are set cyclically at a pitch 4p (four times the pixel pitch p of the spatial light modulation element 11) in the x axis direction and y axis direction. In a range equivalent to one cycle of the initial phase distribution indicated by a bold line rectangular frame, the initial phase values of the bright points 71 with the brightness values are different from one another.

At this time, the periodicity of the disposition of the peaks of light reaching the back focal plane of the lens 12 reflects periodicity rendered by synthesizing the disposition and initial phase values of the bright points 71 of the directly reconstruction image 91. That is, the peaks of light reaching the back focal plane of the lens 12 in the case of the third embodiment are located cyclically at a pitch of 0.8 mm (=λf/4p)) in the x axis direction and y axis direction similarly to the case of the first embodiment shown in FIG. 7 above and, among the peaks of light, the optical peak positions of three points exist within the aperture portion 13A (excluding the edge) of the mask 13. Each of the optical peak positions of three points within the aperture portion 13A are peak positions of the reconstruction light rendered through diffraction of a specified order by the spatial light modulation element 11 and arranged in the x axis direction. The reconstruction light distributed close to each of the three optical peak positions include a parallax image component that corresponds with each of the positions.

Accordingly, in the third embodiment, the eye focusing function of the observer, whose eye is disposed close to the aperture portion 13A, is made to work effectively because reconstruction light distributed close to each of the three optical peak positions enters the pupil of the eye simultaneously. Consequently, three images are displaced in the x axis direction when the focal point of the eye is out of place and a reconstruction image with natural blur in the x axis direction can be observed. Furthermore, a reconstruction image in which a low spatial frequency component is dominant can also be favorably observed.

Furthermore, as compared with the case of the first embodiment, in the third embodiment, whereas the three optical peak positions are the same in that these positions exist within the aperture portion 13A (excluding the edge) of the mask 13, there are four times the number of bright points 71 with the brightness values of the directly reconstruction image 91. Hence, the observer can observe a bright reconstruction image with a high resolution.

Figure 11:
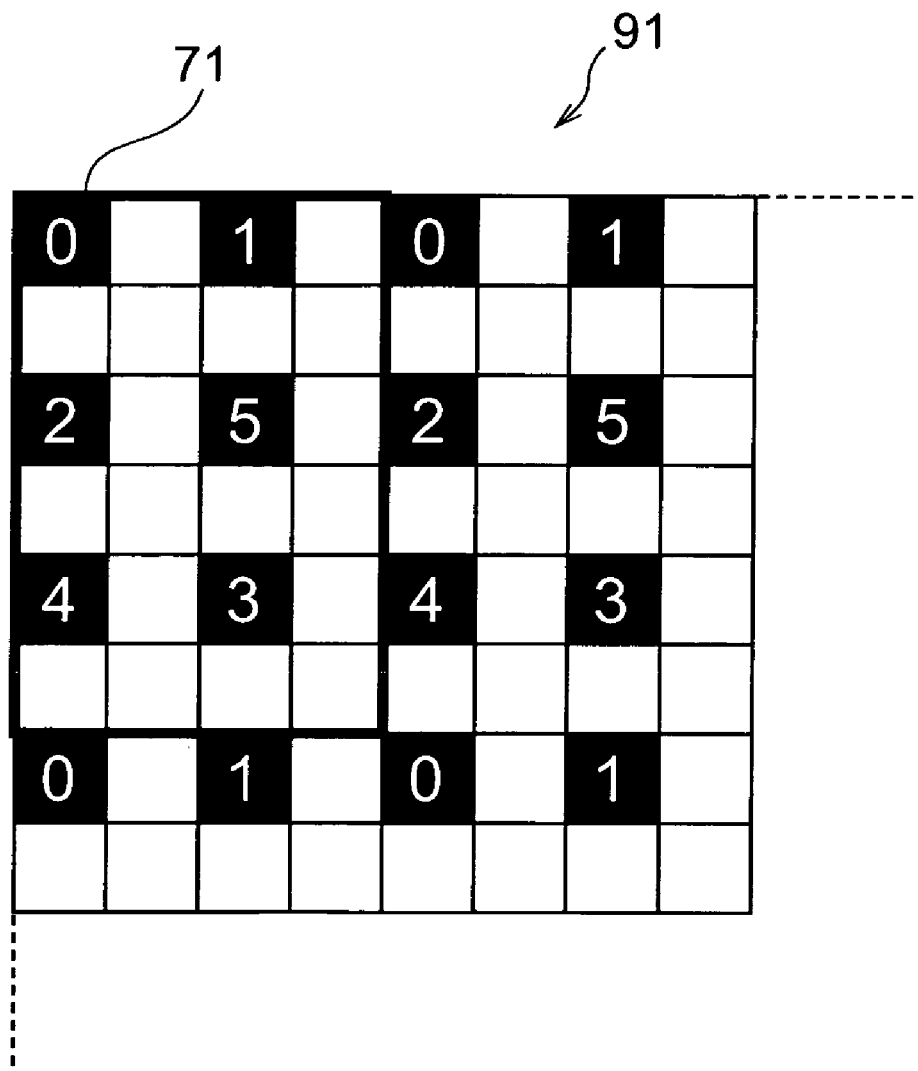
FIG. 11 is a view for explaining a bright point interval and initial phase value of the directly reconstruction image in of a fourth embodiment.

The fourth embodiment will be explained next. FIG. 11 is a view for explaining the bright point interval and initial phase value of the directly reconstruction image 91 in the fourth embodiment.

The view of FIG. 11 is the same as the case of FIG. 4 or the like. In addition, the initial phase values of the bright points 71 with the brightness values of the directly reconstruction image 91 are shown with numbers in squares that are painted black. The number '0' denotes the reference value of the initial phase value, the number '1' indicates that the initial phase value is 'reference value+π/3', the number '2' indicates that the initial phase value is 'reference value+2π/3', the number '3' indicates that the initial phase value is 'reference value+π', the number '4' indicates that the initial phase value is 'reference value+4π/3', and the number '4' indicates that the initial phase value is 'reference value +5π/3'.

In the fourth embodiment, the bright points 71 with the brightness values of the directly reconstruction image 91 reconstructed directly by the spatial light modulation element 11 are disposed cyclically at a pitch of 2p (two times the pixel pitch p of the spatial light modulation element 11) in the x axis direction and y axis direction in the same way as the comparative example. Furthermore, the initial phase values of the bright points 71 with the brightness values are set cyclically at a pitch 4p (four times the pixel pitch p of the spatial light modulation element 11) in the x axis direction and set cyclically at the pitch 6p (six times the pixel pitch p of the spatial light modulation element 11) in the y axis direction. In a range equivalent to one cycle of the initial phase distribution indicated by a bold line rectangular frame, the initial phase values of the bright points 71 with the brightness values are different from one another.

At this time, the periodicity of the disposition of the peaks of light reaching the back focal plane of the lens 12 reflects periodicity rendered by synthesizing the disposition and initial phase values of the bright points 71 of the directly reconstruction image 91. That is, the peaks of light reaching the back focal plane of the lens 12 in the case of the fourth embodiment are located cyclically at a pitch of 0.8 mm (=λf/(4p)) in the x axis direction and are located cyclically at a pitch of 0.53 mm (=λf/6p)) in the y axis direction similarly to the case of the second embodiment shown in FIG. 9 above and, among the peaks of light, the optical peak positions of six points exist within the aperture portion 13A (excluding the edge) of the mask 13. Each of the optical peak positions of six points within the aperture portion 13A are peak positions of the reconstruction light rendered through diffraction of a specified order by the spatial light modulation element 11 and arranged in three columns in the x axis direction and two rows in the y axis direction. The reconstruction light distributed close to each of the six optical peak positions include a parallax image component that corresponds to each of the positions.

Accordingly, in the fourth embodiment, the eye focusing function of the observer whose eye is disposed close to the aperture portion 13A is made to work effectively because reconstruction light distributed close to each of the six optical peak positions enters the pupil of the eye simultaneously. Consequently, three images are displaced in the x axis direction and two images are displaced in the y axis direction when the focal point of the eye is out of place and a reconstruction image with natural blur in the x axis direction and y axis direction can be observed. Furthermore, a reconstruction image in which a low spatial frequency component is dominant can also be favorably observed.

Furthermore, as compared with the case of the second embodiment, in the fourth embodiment, whereas the six optical peak positions are the same in that these positions exist within the aperture portion 13A (excluding the edge) of the mask 13, there are six times the number of bright points 71 with the brightness values of the directly reconstruction image 91. Hence, the observer can observe a bright reconstruction image with a high resolution.

Figure 12:
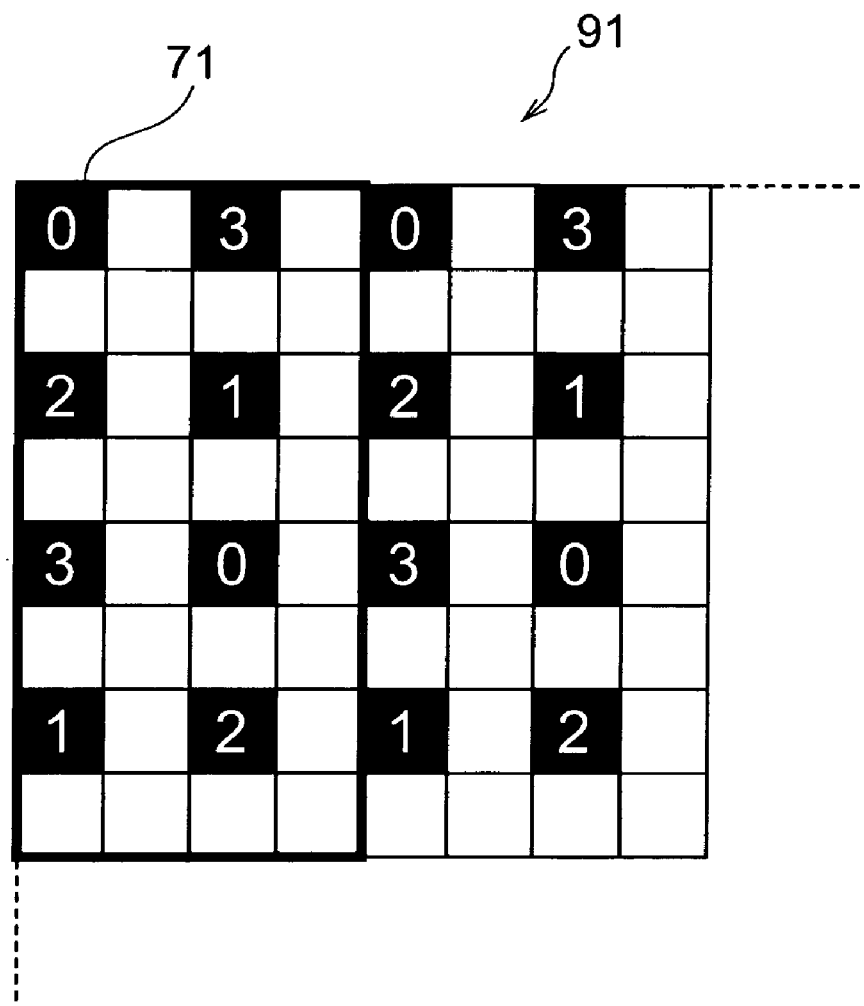
FIG. 12 is a view for explaining a bright point interval and initial phase value of the directly reconstruction image 91 in a fifth embodiment.
Figure 13:
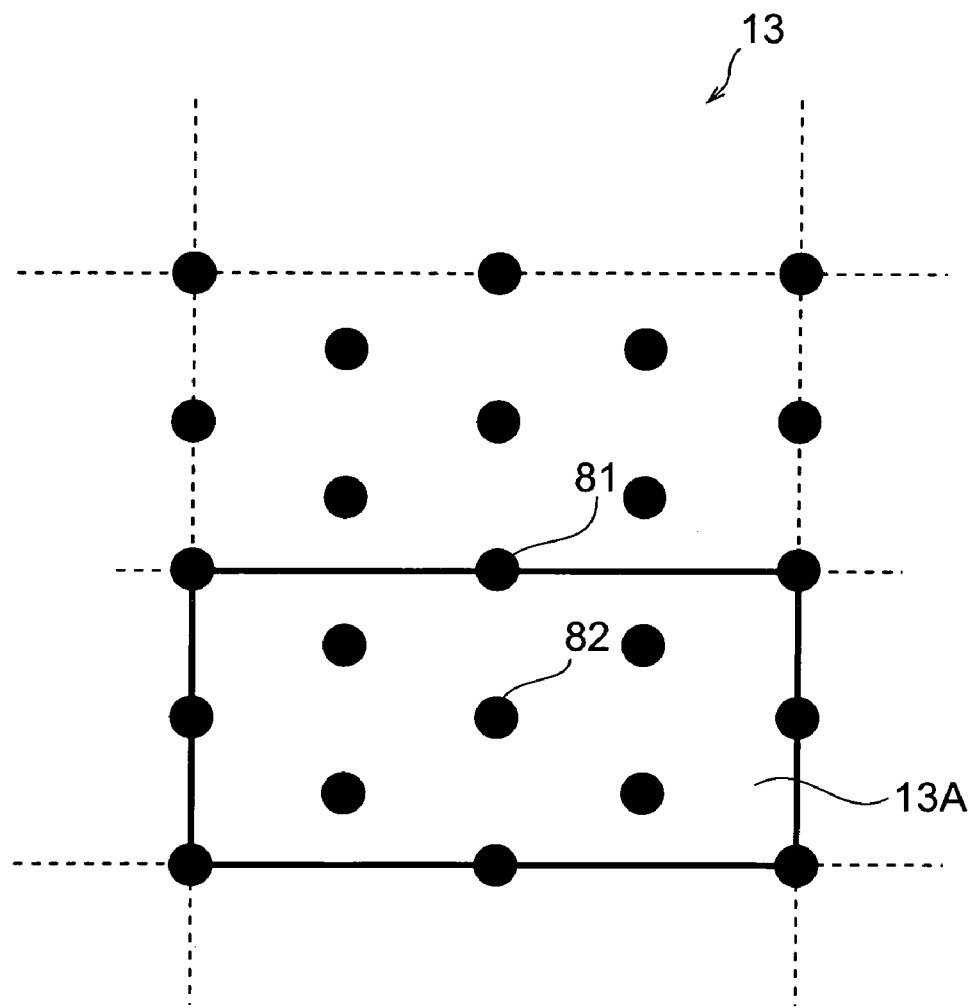
FIG. 13 is a view for explaining peak positions of light that reaches the back focal plane of the lens 12 in the fifth embodiment.

The fifth embodiment will be explained next. FIG. 12 is a view for explaining the bright point interval and initial phase value of the directly reconstruction image 91 of the fifth embodiment. FIG. 13 is a view for explaining the peak positions of light that reaches the back focal plane of the lens 12 of a fifth embodiment.

The view of FIG. 12 is the same as the case of FIG. 4 or the like. In addition, the initial phase values of the bright points 71 with the brightness values of the directly reconstruction image 91 are shown with numbers in squares that are painted black. The number '0' denotes the reference value of the initial phase value, the number '1' indicates that the initial phase value is 'reference value+π/2', the number '2' indicates that the initial phase value is 'reference value+π', and the number '3' indicates that the initial phase value is 'reference value+3π/2'. In the fifth embodiment, the bright points 71 with the brightness values of the directly reconstruction image 91 reconstructed directly by the spatial light modulation element 11 are the same as those of the comparative example and are disposed cyclically at a pitch 2p (two times the pixel pitch p of the spatial light modulation element 11) in the x axis direction and y axis direction respectively. Furthermore, the initial phase values of the bright points 71 with the brightness values are set cyclically at a pitch 4p in the x axis direction and set cyclically at a pitch 8p in the y axis direction, and also set cyclically at a pitch $20^{1/2} p (=((2p)^2+(4p)^2)^{1/2})$ in the direction of vector (±2p, ±4p). In a range equivalent to one cycle of the initial phase distribution indicated by a bold line rectangular frame, the initial phase values of the bright points 71 with the brightness values are the same and two of each exist.

At this time, the periodicity of the disposition of the peaks of light reaching the back focal plane of the lens 12 reflects periodicity rendered by synthesizing the disposition and initial phase values of the bright points 71 of the directly reconstruction image 91. That is, the peaks of light reaching the back focal plane of the lens 12 in the case of the fifth embodiment are located cyclically at a pitch of 1.6 mm (=λf/4p)) in the x axis direction, located cyclically at a pitch of 0.8 mm (=λf/8p)) in the y axis direction, and located cyclically at a pitch of 0.89 mm (=$((0.8)^2+(0.4)^2)^{1/2}$) in the vector (±2, ±1), as shown in FIG. 13. Among the peaks of light, the optical peak positions of five points exist within the aperture portion 13A (excluding the edge) of the mask 13. Each of the optical peak positions of five points within the aperture portion 13A are peak positions of the reconstruction light rendered through diffraction of a specified order by the spatial light modulation element 11 and the area around the optical peak position 82 in the center of the aperture portion 13A surrounds the four other optical peak positions. The reconstruction light distributed close to each of the five optical peak positions include a parallax image component that corresponds with each of the positions.

Accordingly, in the fifth embodiment, the eye focusing function of the observer whose eye is disposed close to the aperture portion 13A is made to work effectively because reconstruction light distributed close to each of the five optical peak positions enters the pupil of the eye simultaneously. Consequently, when the focal point of the eye is out of place, a reconstruction image with natural blur in the x and y axis directions can be observed. Furthermore, a reconstruction image in which a low spatial frequency component is dominant can also be favorably observed. In addition, as compared with the case of the first embodiment, there is four times the number of bright points 71 with the brightness values of the directly reconstruction image 91. Hence, the observer can observe a bright reconstruction image with a high resolution.

Figure 14:
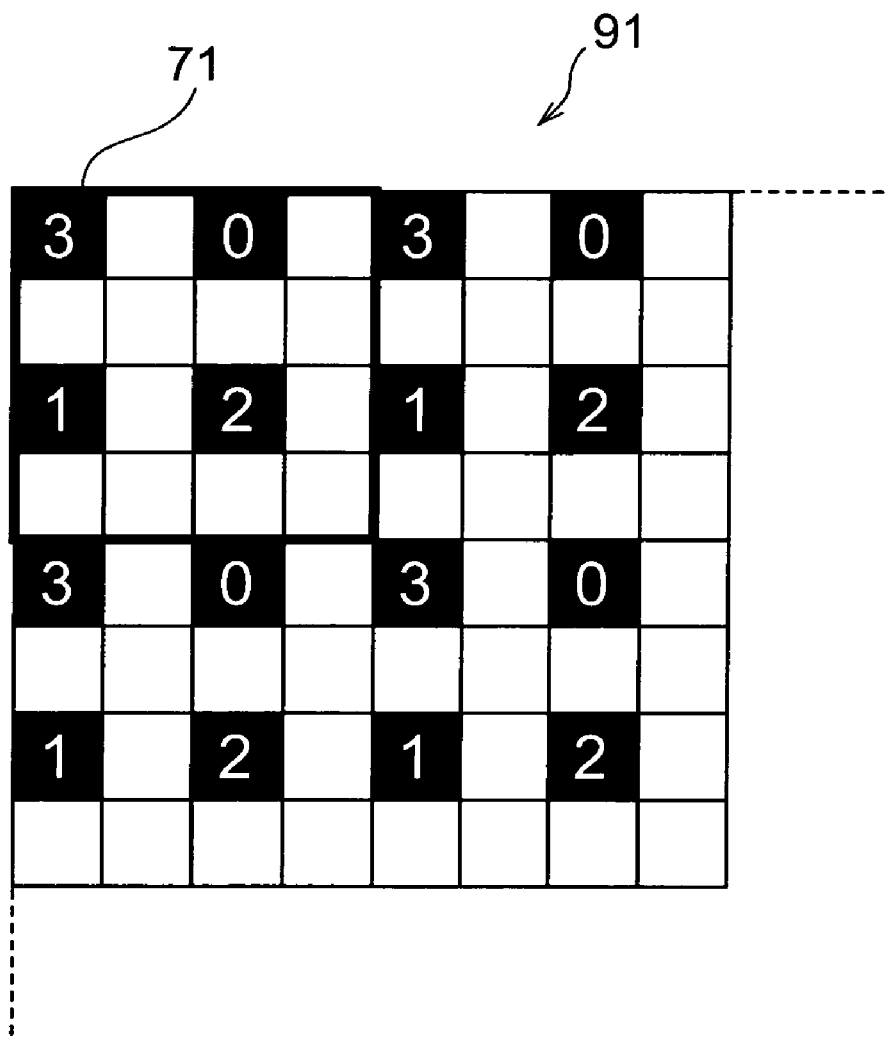
FIG. 14 is a view for explaining a bright point interval and initial phase value of the directly reconstruction image 91 in a sixth embodiment.

The sixth embodiment will be explained next. In the sixth embodiment, the initial phase values of the respective bright points 71 constituting the target reconstruction image 91 are temporally varied. More specifically, the distribution of the bright point interval and initial phase values of the directly reconstruction image 91 shown in FIG. 10 earlier and the distribution of the bright point interval and initial phase values of the directly reconstruction image 91 shown in FIG. 14 are set to alternate temporally. One distribution corresponds to a distribution that is moved in parallel by a distance 2p in the x axis direction with respect to the other distribution.

Figure 15:
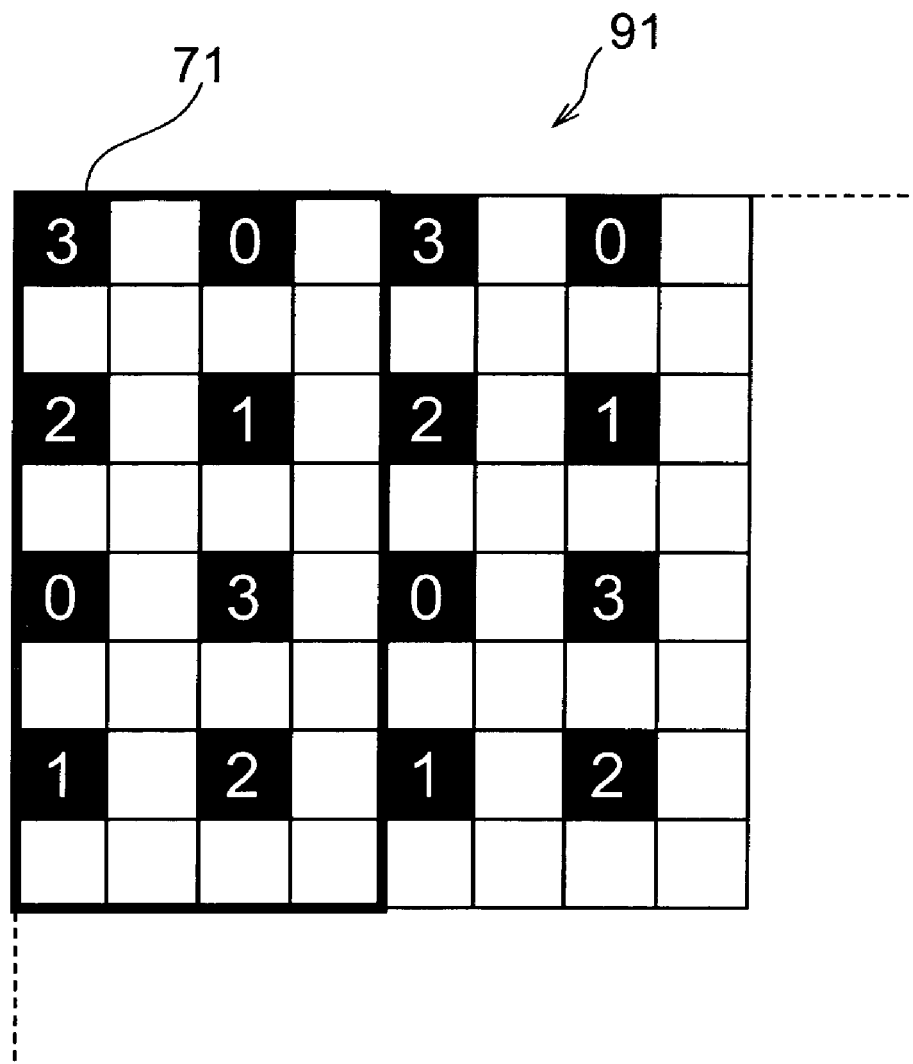
FIG. 15 is a view for explaining a bright point interval and initial phase value of the directly reconstruction image 91 in the sixth embodiment.
Figure 16:
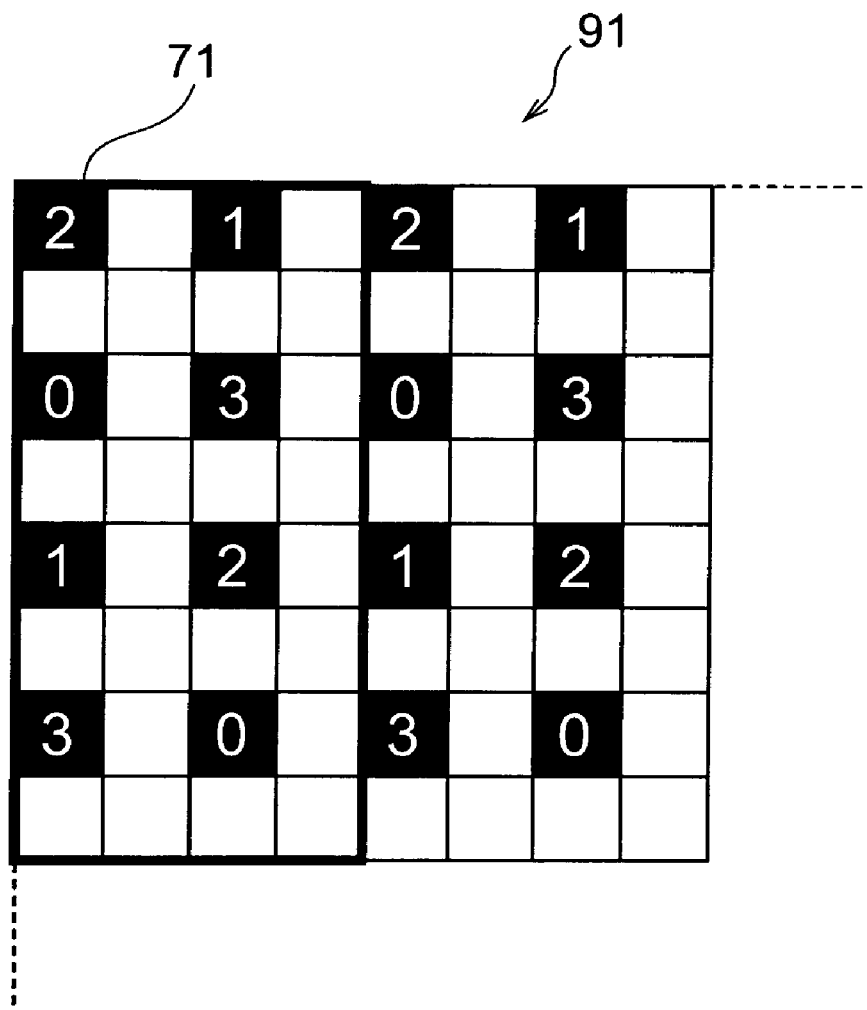
FIG. 16 is a view for explaining a bright point interval and initial phase value of the directly reconstruction image 91 in the sixth embodiment.
Figure 17:
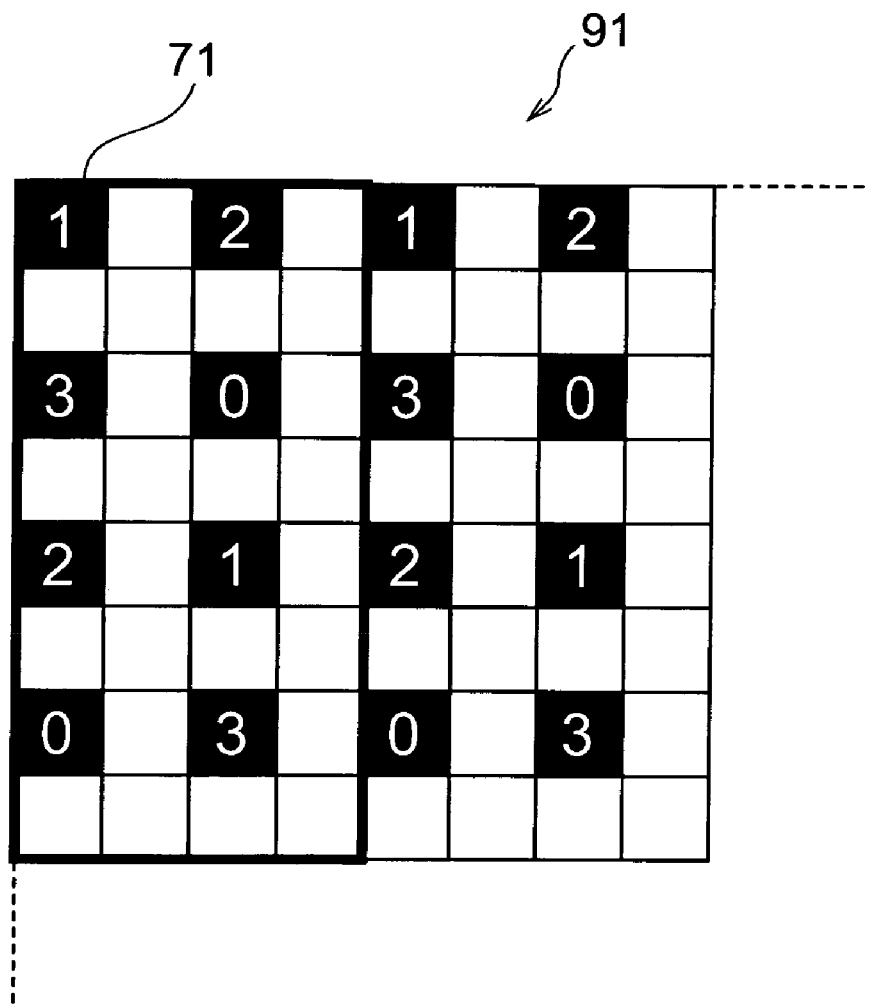
FIG. 17 is a view for explaining a bright point interval and initial phase value of the directly reconstruction image 91 in the sixth embodiment.

Alternatively, the distribution of the bright point interval and initial phase values of the directly reconstruction image 91 shown in FIG. 12, the distribution of the bright point interval and initial phase values of the directly reconstruction image 91 shown in FIG. 15, the distribution of the bright point interval and initial phase values of the directly reconstruction image 91 shown in FIG. 16, and the distribution of the bright point interval and initial phase values of the directly reconstruction image 91 shown in FIG. 17 are set to sequentially repeat temporally. Thus, a more vivid reconstruction image can be displayed. With respect to a certain one distribution, another distribution corresponds to any of a distribution moved in parallel by the distance 2p in the x axis direction, a distribution moved in parallel by the distance 2p in the y axis direction, and a distribution moved in parallel by the distance 2p in each of the x axis direction and y axis direction.

In a case where only the distribution of the bright point interval and initial phase values of the directly reconstruction image 91 shown in FIG. 10 is set, or in a case where only the distribution of the bright point interval and initial phase values of the directly reconstruction image 91 shown in FIG. 12 is set, the illumination light irradiated onto the spatial light modulation element 11 is coherent light and, therefore, an interference fringe pattern with a cyclical structure is superposed on the reconstruction image observed via the aperture portion 13A of the mask 13. Hence, the number of pixels of observed the reconstruction image decreases.

However, in the sixth embodiment, the interference fringe patterns superposed on the reconstruction image by temporally and alternately setting the distributions of the bright point interval and initial phase values of the directly reconstruction image 91 shown in FIGS. 10 and 14 respectively or by making settings to temporally sequentially repeat the distributions of the bright point interval and initial phase values of the directly reconstruction image 91 shown in FIG. 12 and FIGS. 15 to 17 corresponding to the initial phase value distribution at each point in time and are temporally offset. Hence, the affect of the interference fringe patterns is reduced and a more vivid reconstruction image can be displayed.

The seventh embodiment will be explained next. The seventh embodiment differs from the comparative example and the respective embodiments described thus far in that the focal length f of the lens 12 is 120 mm. In this case, the size of the aperture portion 13A of the mask 13 is the same as the size of the region permitting observation of a reconstruction image rendered through diffraction of a specified order, that is, 9.6 mm×4.8 mm. Since the pupil diameter of the observer's eye is on the order of 3 mm, the pupil diameter of the observer's eye is smaller than the size of the aperture portion 13A of the mask 13. The reconstruction light close to each of a plurality of optical peak positions in this case must also simultaneously enter the pupil of the eye in this case.

At this time, in the seventh embodiment, the bright points 71 with the brightness values of the directly reconstruction image 91 directly reconstructed by the spatial light modulation element 11 are cyclically disposed at a pitch of 4p (four times the pixel pitch p of the spatial light modulation element 11) in the x axis and y axis directions respectively. Furthermore, the initial phase values of the bright points 71 with the brightness values are cyclically disposed at a pitch of 8p (eight times the pixel pitch p of the spatial light modulation element 11) in the x axis and y axis directions respectively.

Figure 18:
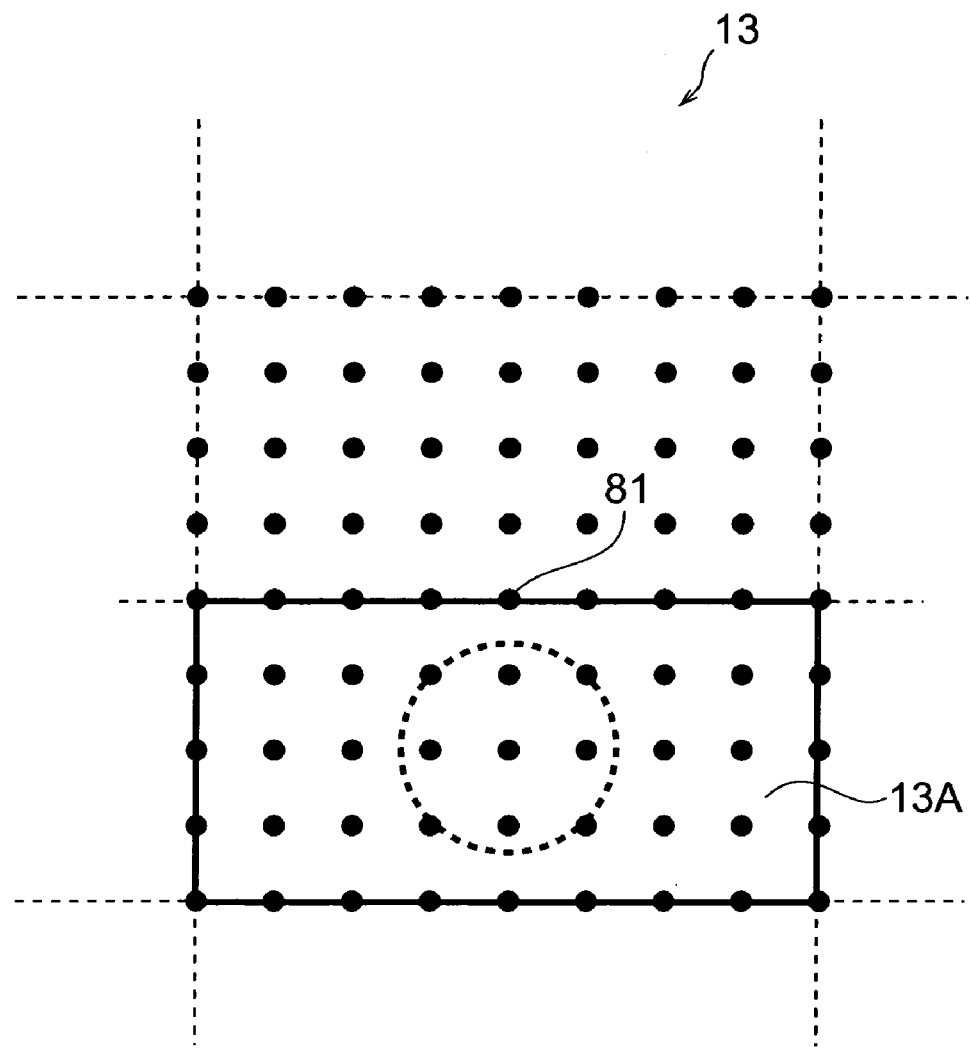
FIG. 18 is a view for explaining peak positions of light that reaches the back focal plane of the lens 12 in a seventh embodiment.

Accordingly, the peak of the light arriving at the back focal plane of the lens 12 in the case of the seventh embodiment is cyclically located at a pitch of 1.2 mm (=λf/(8p)) in the x axis and y axis directions respectively, as shown in FIG. 18 and, among the peaks of light, the optical peak positions of twenty-one points exist within the aperture portion 13A (excluding the edge) of the mask 13. Each of the optical peak positions of twenty-one points within the aperture portion 13A are peak positions of the reconstruction light rendered through diffraction of a specified order by the spatial light modulation element 11 and arranged in seven columns in the x axis direction and three rows in the y axis direction. The reconstruction light distributed close to each of the twenty-one optical peak positions include a parallax image component that corresponds to each of the positions.

Accordingly, in the seventh embodiment, the eye focusing function of the observer whose eye is disposed close to the aperture portion 13A is made to work effectively because reconstruction light distributed close to each of the five optical peak positions among the twenty-one points enters the pupil of the eye (broken line circle in FIG. 18) simultaneously. Consequently, when the focal point of the eye is out of place, the reconstruction image with natural blur in the x axis direction and y axis direction can be observed. Further, a reconstruction image in which a low spatial frequency component is dominant can also be favorably observed.

The eighth embodiment will be explained next. The eighth embodiment is characterized by the shape of the aperture portion 13A of the mask 13, as compared with each of the embodiments described above. The mask 13 of this embodiment transmits light components matching the peak positions of the reconstruction light that arrives in the region ($\lambda f/p$, $\lambda f/(2p)$) where the observation of reconstruction image rendered through diffraction of a specified order is permitted. However, the aperture portion 13A not only blocks zero-order light and diffracted waves and conjugated waves of unnecessary orders as well as light beams reaching the edge of the region, but also blocks reconstruction light rendered through diffraction or orders other than the specified order that arrives in the region.

Figure 19:
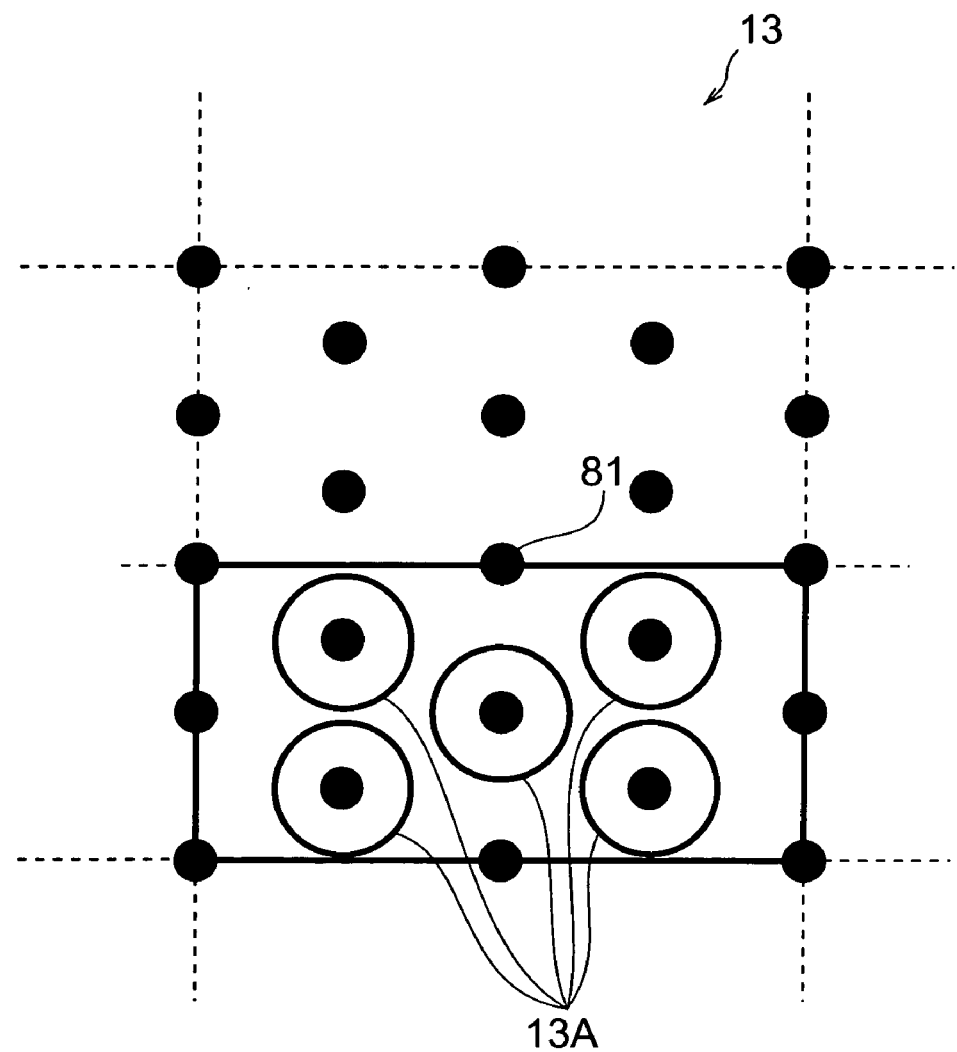
FIG. 19 is a view for explaining peak positions of light that reaches the back focal plane of the lens 12 and the shape of an aperture portion 13A of a mask 13 in an eighth embodiment.
Figure 20:
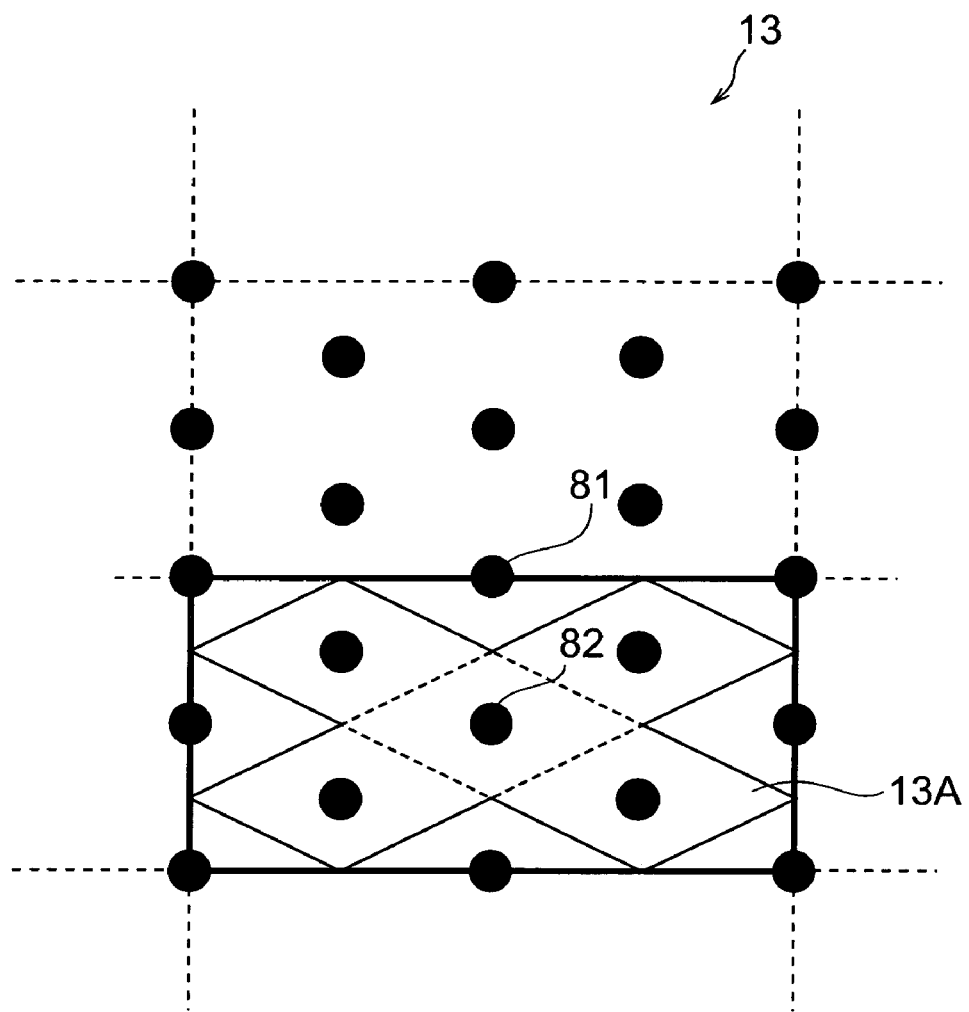
FIG. 20 is a view for explaining peak positions of light that reaches the back focal plane of the lens 12 and the shape of the aperture portion 13A of the mask 13 in the eighth embodiment.

For example, as per the fifth embodiment (FIGS. 12 and 13) described earlier, when optical peak positions of five points exist in a region (excluding the edge) where the observation of reconstruction image rendered through diffraction of a specified order is permitted, a circular region that has each of the five points at the center is the aperture portion 13A as shown in FIG. 19. Alternatively, as shown in FIG. 20, a diamond shape (two adjacent diamond shapes may be in contact with one another) that has each of the five points at the center is the aperture portion 13A.

By affording the aperture portion 13A such a shape, the reconstruction light rendered through diffraction of an order other than the specified order in the periphery of the peak position of the light beam that reaches the edge of the region ($\lambda f/p$, $\lambda f/(2p)$) is blocked, whereby a more vivid reconstruction image can be observed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Industrial Applicability

The present invention can be applied to an apparatus and a method capable of displaying a three-dimensional reconstruction image by causing illumination light to enter a spatial light modulation element that provides a hologram.

The invention claimed is:
1. A three-dimensional image displaying apparatus, comprising:
a spatial light modulation element having a discrete pixel structure and expressing a hologram;
an illumination optical system generating reconstruction light by causing illumination light to enter said spatial light modulation element that expresses the hologram;
a reconstruction image converting optical system displaying a reconstruction image by producing a virtual image wavefront-converted from the reconstruction light;
a mask provided on the back focal plane of said reconstruction image converting optical system while said mask is located a predetermined distance away from said spatial light modulation element, said mask blocking at least light components obtained through diffraction of a different order other than the specified order in said spatial light modulation element; and
an opening portion provided on said mask, said opening portion transmitting light components in the reconstruction light from said spatial light modulation element,
wherein at least one of each interval between bright points and each initial phase value of the bright points is set such that peaks of the reconstruction light are produced at different plural points on the back focal plane of said reconstruction image converting optical system, the bright points constituting a target reconstruction image to be displayed, the reconstruction light reaching said opening portion where the observation of reconstruction image obtained through diffraction of the specified order is permitted.

2. The three-dimensional image displaying apparatus according to claim 1, wherein the each initial phase value of the bright points is varied as time elapses after the each initial phase value of the bright points is set such that the peaks of the reconstruction light are produced at the different plural points on the back focal plane of said reconstruction image converting optical system.

3. A three-dimensional image displaying method, comprising the steps of:
preparing the three-dimensional image displaying apparatus as set forth in claim 1; and
causing said spatial light modulation element to express a hologram capable of displaying the target reconstruction image to be displayed, by using the three-dimensional image displaying apparatus.

4. The three-dimensional image displaying method according to claim 3, wherein the each initial phase value of the bright points is varied as time elapses after the each initial phase value of the bright points is set such that the peaks of the reconstruction light are produced at the different plural points on the back focal plane of said reconstruction image converting optical system.

5. The three-dimensional image displaying method according to claim 3,
wherein the reconstruction image is displayed by means of the light components having passed through the opening portion on said mask.

6. The three-dimensional image displaying method according to claim 3, wherein a minimum peak interval in the reconstruction light reaching the observation region is smaller than the diameter of the pupil of an observer observing the reconstruction image.

7. The three-dimensional image displaying method according to claim 3, wherein, when the wavelength of the illumination light is $\lambda$, the focal length of said reconstruction image converting optical system is f, the pixel pitch of said spatial light modulation element is p, the diameter of the pupil of the observer observing the reconstruction image is d, and the interval of the bright points of an equal initial phase value among the bright points constituting the target reconstruction image is Np (N is an integer of two or more), the following relationship is satisfied:

$d/2 > \lambda f/(Np)$.

* * * * *

UNITED STATES PATENT AND TRADEMARK OFFICE
CERTIFICATE OF CORRECTION

PATENT NO.       : 8,400,696 B2                                              Page 1 of 1
APPLICATION NO. : 10/585253
DATED            : March 19, 2013
INVENTOR(S)      : Ikeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1865 days.

Signed and Sealed this
First Day of September, 2015

Michelle K. Lee
*Director of the United States Patent and Trademark Office*